(12) United States Patent
Micklavzina et al.

(10) Patent No.: US 7,752,068 B1
(45) Date of Patent: Jul. 6, 2010

(54) SYNERGY TRACKING TOOL

(75) Inventors: Charles L. Micklavzina, Overland Park, KS (US); Jeffrey W. Stovall, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 957 days.

(21) Appl. No.: 11/534,635

(22) Filed: Sep. 22, 2006

(51) Int. Cl.
G06F 17/30 (2006.01)
(52) U.S. Cl. ........................................ 705/10
(58) Field of Classification Search ............ 705/10
See application file for complete search history.

(56) References Cited

U.S. PATENT DOCUMENTS 5,963,910 A * 10/1999 Ulwick .................. 705/7
2004/0249657 A1 * 12/2004 Kol et al. ................ 705/1

OTHER PUBLICATIONS

Weber et al (Including Marketing Synergy Acquisition Analysis: : A Step Wise Approach), Feb. 2000, pp. 1-39.*
Kol et al (Estimating the synergy value in mergers and acquisitions: A preliminary model and its relevance for the chemical industry), Dec. 2005, Publication View, p. 1.*
Davis et al (Cost synergies and Post-Merger Predictions in Asymmetric Logit Environments, Nov. 2001, JEL Classification, pp. 1-56.*
Weston (The Exxon-Mobile Merger: An archetype), Feb. 2002, Forthcoming Journal of Applied Finance, Financial Management Association, pp. 1-49.*
Chang (A Measure in the Synergy in Mergers under a competitive Market for Corporate Control), Jun. 1988, Atlantic Economic Journal, vol. XVI, pp. 1-4.*
Pareto et al (Realizing Value from Acquisitions), Sep. 1995, The Electric Journal, pp. 1-6.*
Larsson et al (Integrating Strategic, Organizational, and Human Resource Perspectives on Mergers and Acquisitions: A Case Survey of Synergy Realization), Feb. 1999, Organization Science vol. 10, No. 1, pp. 1-27.*
Nielsen et al (A Financial Analysis of Acquisition and Merger Premiums), Mar. 1973, Journal of Financial and Quantitative Analysis, pp. 1-11.*

* cited by examiner

Primary Examiner—Romain Jeanty

(57) ABSTRACT

Disclosed herein is a synergy tracking tool and method for tracking target, forecast, and actual synergies created by a merger or other activity. The tool provides a disciplined method for synergy tracking relative to an implementation plan for executing the merger or other activity. This tool provides a formal way for reporting savings and lining up the savings with an implementation plan to explain why the savings are occurring.

20 Claims, 19 Drawing Sheets

SYNERGY TRACKING TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Synergy is an often used and under defined term to justify mergers between enterprises. Synergy generally refers to the savings achieved when two or more separate enterprises are combined to create one enterprise. For example, enterprise A and enterprise B each use similar billing systems to bill their customers. Each billing system costs $1 million a year to maintain for a combined total of $2 million a year spent by enterprises A and B on their billing systems. The merger of enterprise A and enterprise B may be justified in part through a unified billing system which may cost a predicted $1.5 million a year to maintain. In this example a predicted synergy of $0.5 million dollars a year is gained through the merger of enterprises A and B.

While the predicted synergy of two or more enterprises is a main reason behind the merger of enterprises it is not tracked within an enterprise or reported in any standardized way to the public or investors, such as through a provision in the Sarbanes-Oxley Act of 2002. Thus there is no way to ensure that the predicted synergy is actually occurring. This is further exacerbated because current financial systems are designed to track money that is spent and are not designed to track money that is saved.

SUMMARY

Accordingly there is disclosed herein an information carrier medium containing instructions that, when placed in operable relation to a computing device, cause the computing device to display a hierarchical grouping of activities in a merger. Upon receiving user inputs to select one of the displayed activities, synergy data may be displayed corresponding to the selected activity. The synergy data comprises target, forecast, and actual synergy data over a period of time.

In another embodiment there is disclosed a method of tracking synergy comprising setting a target synergy, generating a forecast synergy for comparison with the target synergy, tracking an actual synergy achieved, and updating the forecast synergy based in part on the actual synergy.

In a further embodiment there is disclosed a system for tracking synergy, comprising a memory that stores synergy tracking software, and a processor coupled to the memory to execute the synergy tracking software. The synergy tracking software configures the processor to display a hierarchical grouping of activities in a merger. Upon receiving user inputs to select one of the displayed activities, synergy data may be displayed corresponding to the selected activity wherein the synergy data comprises target, forecast, and actual synergy data over a period of time.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 shows an illustrative view that is updated upon selecting a category in window 102.

FIG. 4 shows an illustrative view of window 108 with a quarterly time division.

FIG. 5 shows an illustrative view of a menu for selecting a category view of window 108.

FIG. 6 shows an illustrative view of window 108 with a category view.

FIG. 7 shows an illustrative view of window 108 with an opex/capex view.

FIG. 8 shows an illustrative view of window 108 with a more detail view of a category view.

FIG. 9 shows an illustrative view of window 108 upon selecting the Details tab.

FIG. 11 shows an illustrative view of a menu for modifying the data in window 108.

FIG. 12 shows an illustrative view of a window generated upon selecting to Change the data from the menu in FIG. 16.

FIG. 13 shows an illustrative view of a Recurring Value window upon selecting button 1216 in FIG. 12.

DETAILED DESCRIPTION

Figure 1:
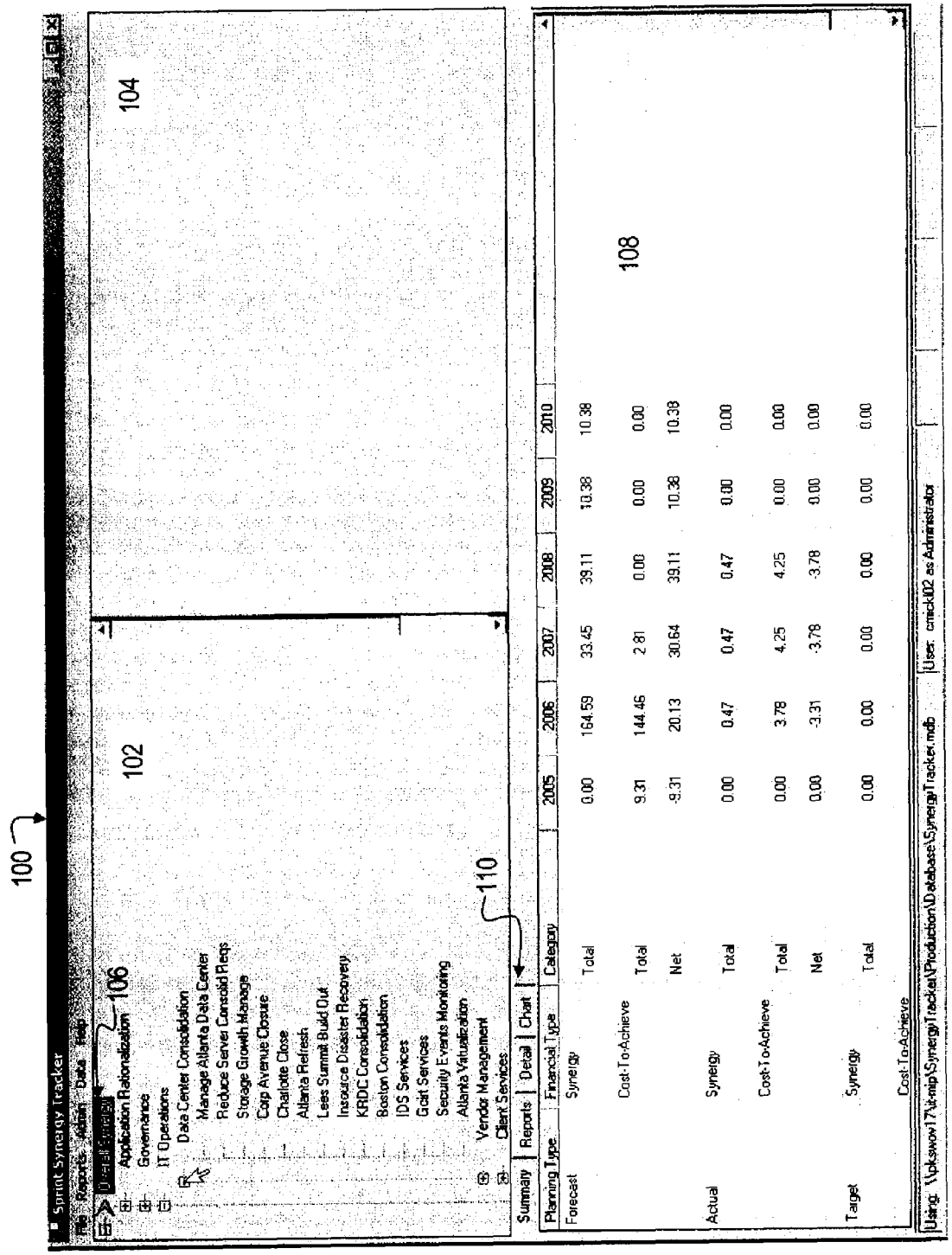
FIG. 1 shows an illustrative starting view of a graphical user interface (GUI) synergy tracking tool.

Disclosed herein is a synergy tracking tool and method for tracking target, forecast, and actual synergies created by a merger or other activity. The tool provides a disciplined method for synergy tracking relative to an implementation plan for executing the merger or other activity. This tool provides a formal way for reporting savings and lining up the savings with an implementation plan to explain why the savings are occurring.

It should be understood at the outset that although an illustrative implementation of one embodiment of the present disclosure is disclosed below, the present system may be implemented using any number of techniques, whether currently known or in existence. The present disclosure should in no way be limited to the illustrative implementations, drawings, and techniques disclosed below, but may be modified within the scope of the appended claims along with their full scope of equivalents.

Through the merger of two or more enterprises, various systems within each of the enterprises may be consolidated in order to reduce costs as compared to each of the enterprises individually implementing each of the systems. Synergy is herein defined as the savings achieved through the consolidation of two or more systems by one or more enterprises. The term "system", as used herein, may refer to any component of an enterprise such as an organization, business, department, computer system, workforce, etc.

One sub-optimal method for tracking synergies would be to compare year end budget changes over a number of years to see if any reductions in the budget occurred. For example, if Enterprise A has a yearly budget of $5 million and Enterprise B has a yearly budget of $2 million and the two enterprises are merged to form an Enterprise C then the year end budget of Enterprise C may be compared to the sum of the budgets of Enterprises A and B. If Enterprise C ends up having a yearly budget of $7 million it may be concluded that no actual synergy was achieved. However, this synergy tracking method is flawed. If it can be shown that over time the individual budgets of Enterprises A and B would have resulted in a total year end budget of $10 million, then the merger to create Enterprise C actually does create a synergy of $3 million.

In another example of this flawed approach, an enterprise may have generated a large synergy though a merger or other activity, and at the same time implemented a large capital improvement project to increase the number of products they produce, or their customer base, etc. If the synergy created and the expense of the capital improvement cancel out in the year end budget for the current and past year, it may appear that no synergy was created. Rather than reporting to investors and the public that no synergy was achieved it may be more beneficial to be able to point out that a synergy was created and the savings were reinvested into the growth of the enterprise.

Because synergy is difficult to measure, it may be susceptible to inflation to provide sufficient justification for the merger of two or more enterprises or other activities. Such susceptibility may end up being detrimental to the enterprise if its failure to achieve a stated synergy goal is recognized and publicized. In order to ensure accurate synergy measurements and to facilitate achieving net positive synergy, it is desirable to be able to track the target, forecast, and actual synergies.

A target synergy refers to the initially predicted synergy that is used to justify a merger or other activity and is the overall expected amount of synergy. This may be the synergy value that is reported to investors in a business case. The business case may include a plurality of spreadsheets or other documents laying out the financial reasoning behind the merger or other activity. The target synergy may be generated from this business case as a total amount of synergy that is reasonably expected. Alternatively, the target synergy may be applied to a timeline indicated in the business case such that there are monthly, quarterly, yearly, etc. target synergy goals.

A forecast synergy refers to a currently predicted synergy that may be achieved. The forecast synergy may be established and changed based on many factors, including a plan for implementing the merger or other activity, trends exposed in actual synergies, changes in the desired timeline for achieving a target synergy, etc. Changes to the forecast plan may occur on a monthly, quarterly, yearly, or any other time basis. Thus the forecast synergy provides a new view on how the target synergy will be achieved upon any of a number of changes occurring. It is noted that while the forecast synergy may be changed based on the implementation plan as was described above, the implementation plan may also be change based on the forecast synergy not meeting the target synergy.

An actual synergy refers to savings created through the actual execution of the implementation plan. The actual synergy may be updated on a recurring basis, for example monthly, and includes synergies up to the current month. In other words actual synergies are not projected into the future. As noted above, future projections of actual synergy is taken into account in the forecast synergy based on trends or problems exposed with the actual synergy. The trending analysis of actual synergy data allows for a more accurate projection of costs and synergies that could be expected based on schedule changes. Also, trending analysis may be applied to "what-if" scenario planning. For example, trending analysis may be used to answer questions such as "What happens to the financial plan if the implementation plan is compressed?" or "What happens if the timing of realizing costs or synergies is altered?". Note that opposed to conventional financial tracking, the actual synergy may include items that money was not spent on.

An example of how an actual synergy may include money that was not spent follows. If Enterprise A was planning on upgrading its computer systems, but because of a merger with Enterprise B, the upgrade was no longer necessary, then the savings of not having to upgrade the computer systems results in an actual synergy. That is, an actual synergy may include savings of money that hadn't been budgeted yet, but an enterprise was intending to or needing to spend on a future date.

It is understood that this concept of reporting savings of money for projects/activities that haven't yet been budgeted or fully planned is potentially susceptible to abuse. For example, a vice president of an enterprise may have an idea of performing a project that could cost up to $15 million to implement. As a result of a merger or some other activity the vice president may decide that the project is no longer necessary. Even though the accounting department would never have given approval for the project, the vice president may want to claim the savings of not performing the project as synergy. Therefore, it may be desirable to have any claims of synergy be approved through internal accounting or audited by a third party accounting firm. Through such an approval processes extraneous claims of synergy may be prevented.

In a merger or other activity there are many one-time capital and operational costs for consolidating systems as well as many recurring capital and operational costs related to the creation, operation, maintenance, and improvement of the consolidated system(s). The one-time and recurring costs are collectively referred to as the cost-to-achieve the consolidated system. There are also many one-time and recurring capital and operational savings, or synergies, achieved through the consolidated system(s).

In the billing system example described in the background section of this application, some capital expenses towards the cost-to-achieve the unified billing system may include improving the billing system of Enterprise A to be able to additionally implement all of the features of the billing system of Enterprise B. Another capital expense may be transferring the data from the billing system of Enterprise B to the improved billing system of Enterprise A in order to create the unified billing system. Some operational expenses towards the cost-to-achieve the unified billing system may include costs for operating and maintaining the unified billing system. Further, some capital expenses synergy of the unified billing system may include the savings from having to only update and improve one system as opposed to two. Also, some operational expenses synergy of the unified billing system may include a reduction in salaries paid through a reduced labor force needed to operate and maintain the unified billing system as opposed to each of the individual billing systems.

In order to determine whether or not a net positive synergy is or will be achieved, the cost-to-achieve the consolidated system(s) is subtracted from the synergy created by the consolidated system(s). It is important to apply this equation on an enterprise level as well as on an individual project or system level. Such granularity is desirable because, in the merger of two enterprises, some consolidated systems may actually create negative synergies and others may create positive synergies. It is important to determine that not only is the net synergy across the merged enterprise positive, but also to determine ways for reducing or eliminating any negative synergies that may be created in a merger.

Since there may be many one-time expenses in the cost-to-achieve consolidated system(s), it is important to track the target, forecast, and actual synergies over an appropriate period of time to determine how long, if ever, the consolidated system(s) need to operate in order to generate a net positive synergy. It is also important to track the synergies over time in order to ensure that the target synergy is being achieved.

In the billing system example described in the background section of this application, if it costs $2 million as the cost-to-achieve the unified billing system from the two billing systems of enterprises A and B, then the unified billing system would have to be operated for at least 4 years in order to break even with the yearly synergy of $0.5 million. If, however, by tracking the actual synergy achieved it is determined that there is a synergy of only $0.4 million a year then it may be forecast that the combined billing system would actually have to be operated for at least 5 years in order to break even. If the life of the combined billing system is 10 years then a net positive synergy is created for either of the above scenarios. If, however, the life of the combined billing system is only 5 years then the implementation of the combined billing system may need to be adjusted in order to generate a greater synergy, such as $0.45 million a year, and thus ensure a net positive synergy rather than just breaking even or possibly ending with a net negative synergy.

FIGS. 1-18 depict an exemplary graphical user interface (GUI) of a tool for planning, organizing, and tracking synergies in an enterprise. Each of the windows in the GUI may be manipulated through a mouse, keyboard, and/or, any other user input devices. Further, the GUI may be implemented on any general purpose computer as discussed in detail below.

FIG. 1 depicts the GUI 100 with windows 102, 104, and 106. Window 102 corresponds to a list of the various categories for synergies in the enterprise. The categories may include various programs, initiatives, and projects being combined, eliminated, etc., for generating a net positive synergy in the enterprise. As shown in FIG. 1 the various categories may be hierarchically organized in a collapsible tree structure or any other organization structure within window 102. Window 104 may be used to display additional information corresponding to a selected category 106. The selected category 106 may be identified in window 102 by a highlight, a marker icon, or any other identifier. As shown in FIG. 1 the Overall Synergy is the currently selected category 106 as indicated by the highlight around the Overall Synergy category and the icon just to the left of the category title. Since the Overall Synergy category is selected, window 104 is not populated in the example of FIG. 1. It is noted that if desirable, this window may be populated with any information concerning the overall merger or other activity. Window 108 includes specific data for the selected category corresponding to a selected tab 110. Tabs 110 may organize the synergy information in different views such as in a Summary, Reports, Detail, and Chart view. In FIG. 1 the Summary tab is selected and as such window 108 displays a summary view of the Overall Synergy category.

The data in the summary view is organized by columns labeled Planning Type, Financial Type, Category, and time columns. The Planning Type column indicates one of the target, forecast, and actual synergies described above. The Financial Type column indicates the synergy created by implementing the selected category 106 and the cost-to-achieve the selected category 106 for each of the planning types. The Category column indicates a particular view of the synergy data for the selected category. In the example of FIG. 1, a Total view is selected by default for showing the total synergy of the selected category 106 for each of the financial types and a net synergy of the selected category 106 for each of the planning types. The time columns describe the time division over a period of time. In the example shown in FIG. 1 the division is yearly and the period is over five years. As described above, the net synergy is calculated by subtracting the cost-to-achieve the selected category 106 from the synergy created by the selected category 106. In particular, as shown for the Forecast Planning Type the cost-to-achieve the Overall Synergy in 2006 is forecast to be $144.46 million and the synergy created is forecast to save $164.59 million resulting in a forecast net positive synergy of $20.13 million.

Figure 2:
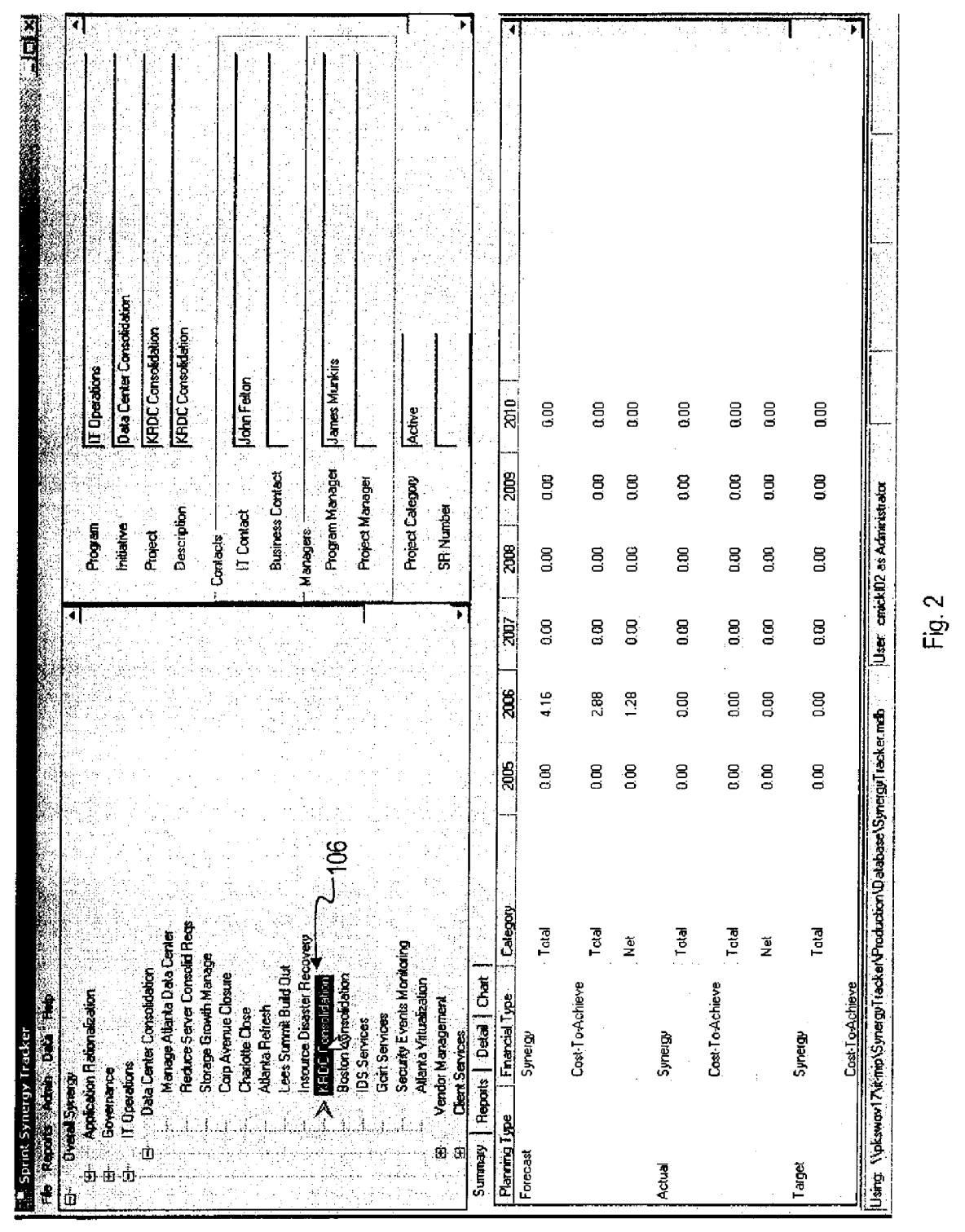

As shown in FIG. 2, upon selecting one of the categories in window 102, windows 104 and 108 are updated with information pertaining to the selected category 106. In the example shown in FIG. 2 a "KRDC Consolidation" project is the currently selected category 106. Window 104 is updated with additional information about the "KRDC Consolidation" category such as, that the project is under the IT Operations program and the Data Center Consolidation initiative as well as a description of the project. Further, window 104 also provides information such as an IT Contact, Business Contact, Program Manager, Project Manager, and other relevant organizational information such as the Project Category. It is noted that different information may be provided in window 104 depending on which category and which level of category is selected in window 102. Window 108 is updated such that the data corresponds to the specific category selected, namely the "KRDC Consolidation" project.

Figure 3:
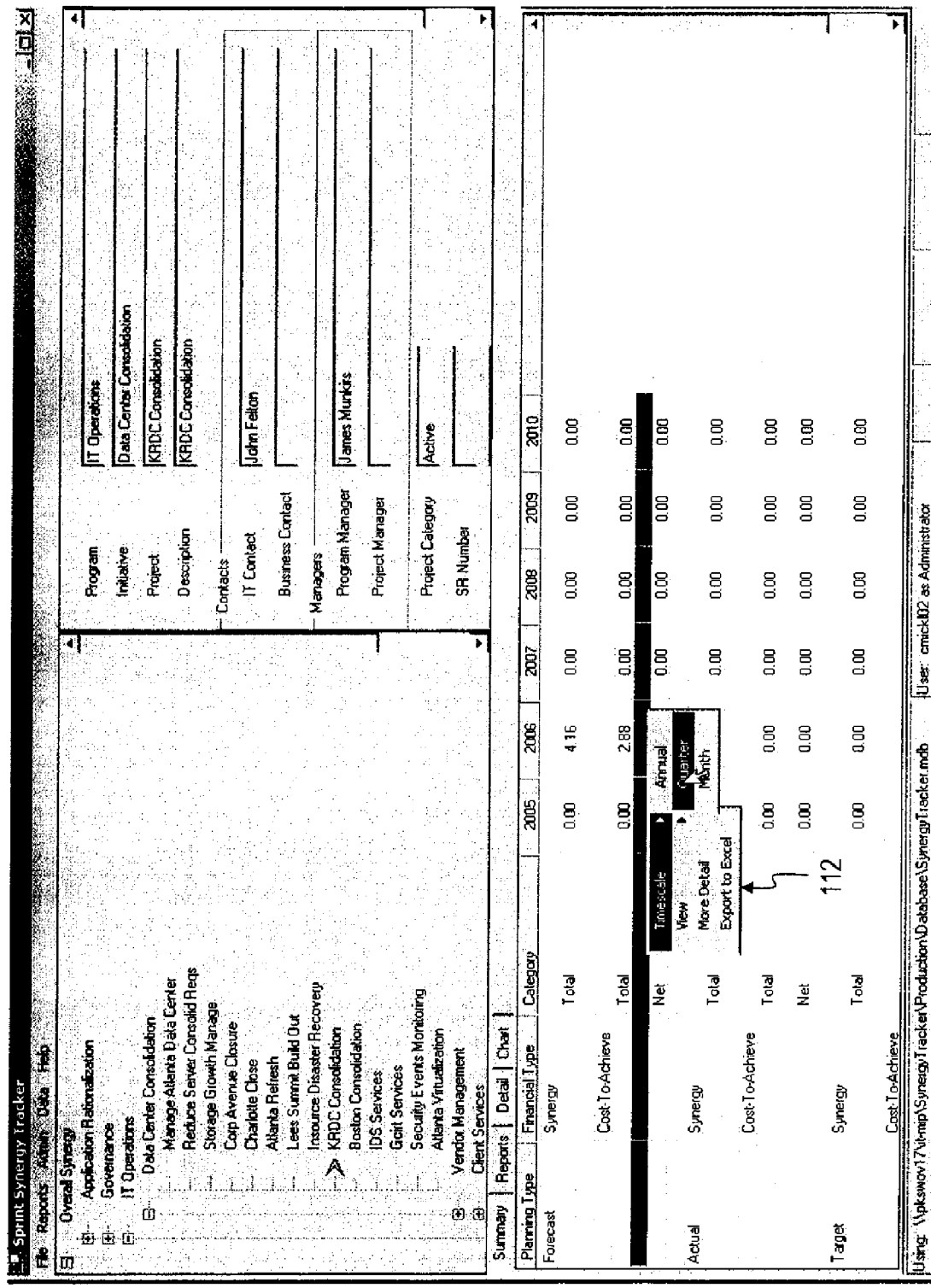
FIG. 3 shows an illustrative view of a menu for adjusting the time division in window 108.
Figure 4:
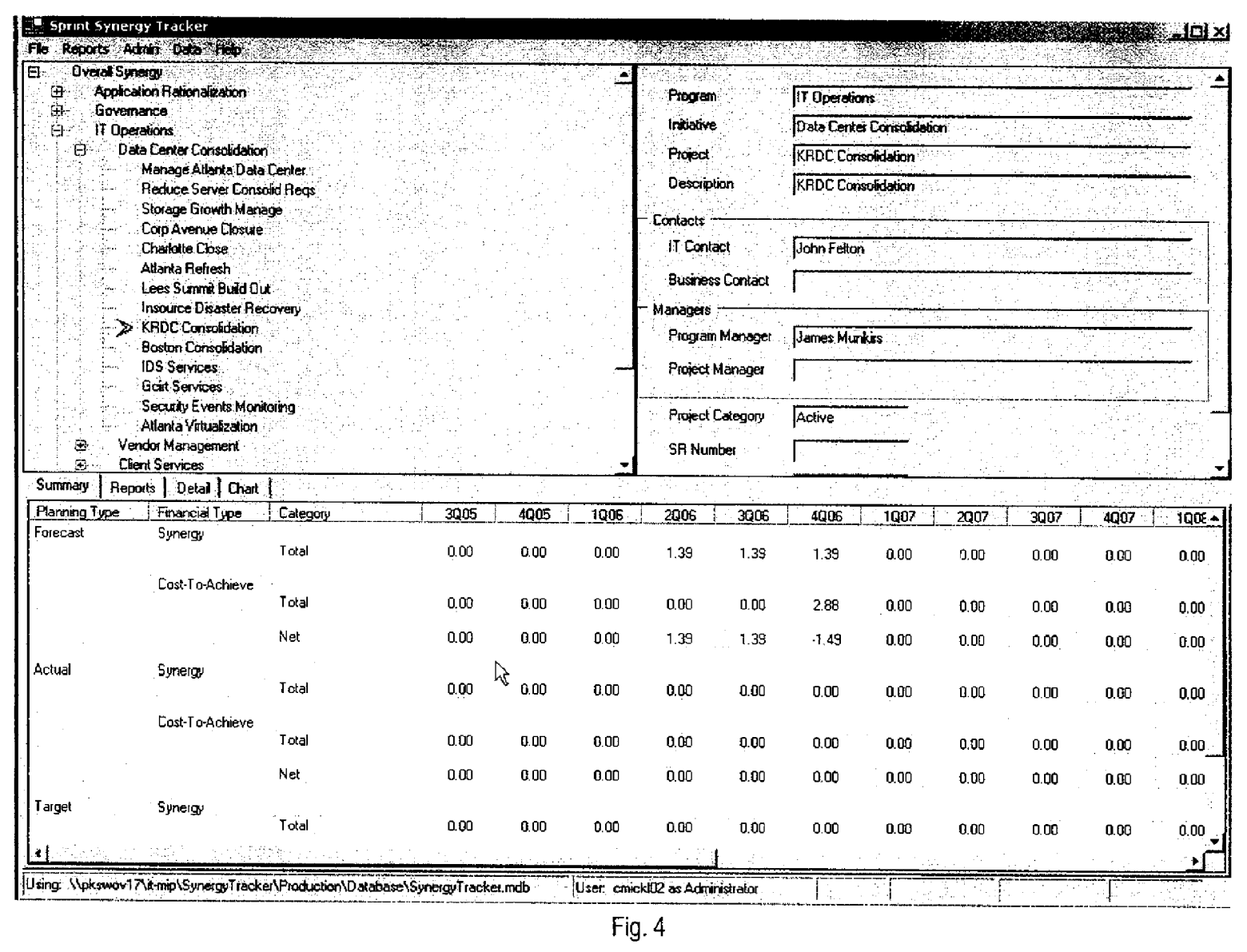

While the time scale shown in the Summary tab is yearly, a menu 112 may be accessed for adjusting the time scale to be any of an annual, quarterly, or monthly time division as shown in FIG. 3. The menu 112 may be accessed by right-clicking a mouse while the cursor is in window 108, for example, though it is understood that any other method may be used to access the menu 112. FIG. 4 shows an example of when the quarterly time division is selected. Note that the scroll bars at the bottom and side of each of the windows may be used to access any information not shown in the current view of the window.

Figure 5:
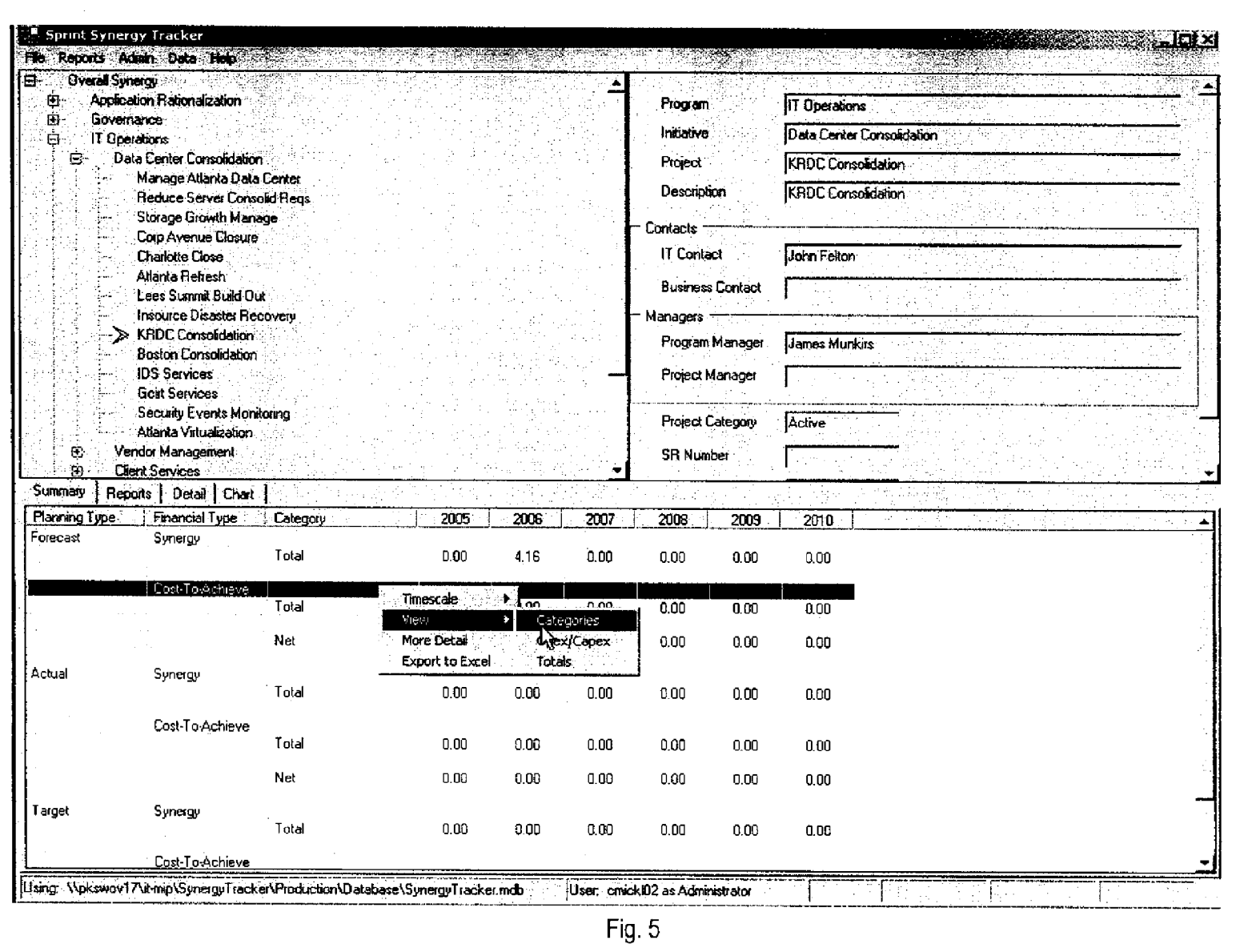
Figure 6:
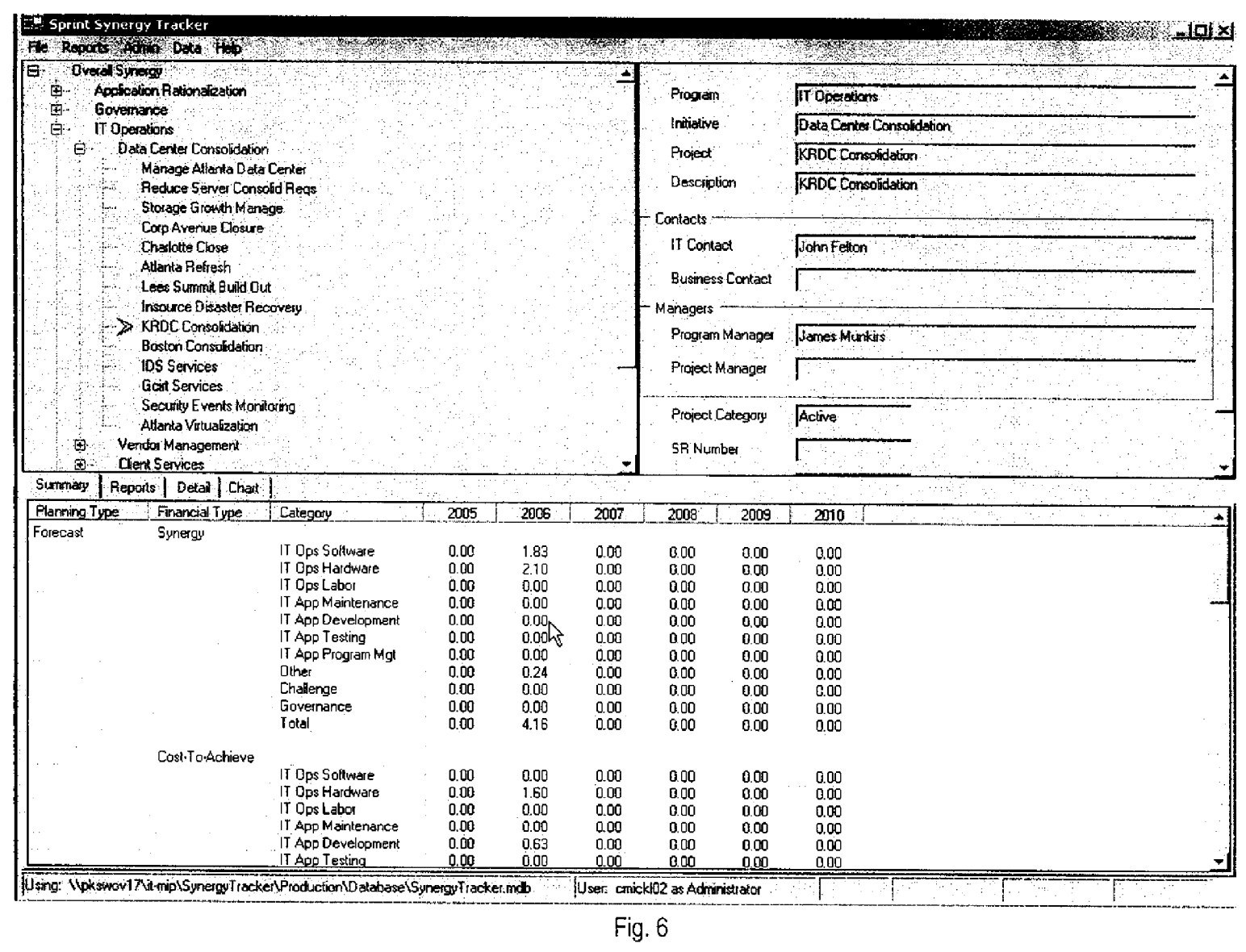

As shown in FIG. 5, by accessing menu 112 within the Summary tab, various views may also be selected for showing varying levels of detail of the synergy data. In FIGS. 1-4 the Total view had been selected for showing the total synergy for each of the financial types and a net synergy for each of the planning types. FIG. 6 shows how window 108 is updated upon selecting the Categories view. As shown in FIG. 6 a categorical breakdown of the total is shown for each for each of the financial types. In the example shown in FIG. 6, these categories may include IT Ops Software, IT Ops Hardware, IT Ops Labor, IT App Maintenance, IT App Development, IT App Testing, IT App Program Mgt, Other, Challenge, and Governance. Note that the total for each financial type and the net for each planning type is still shown and corresponds to the same total and net synergy shown when the Total view is selected.

Figure 7:
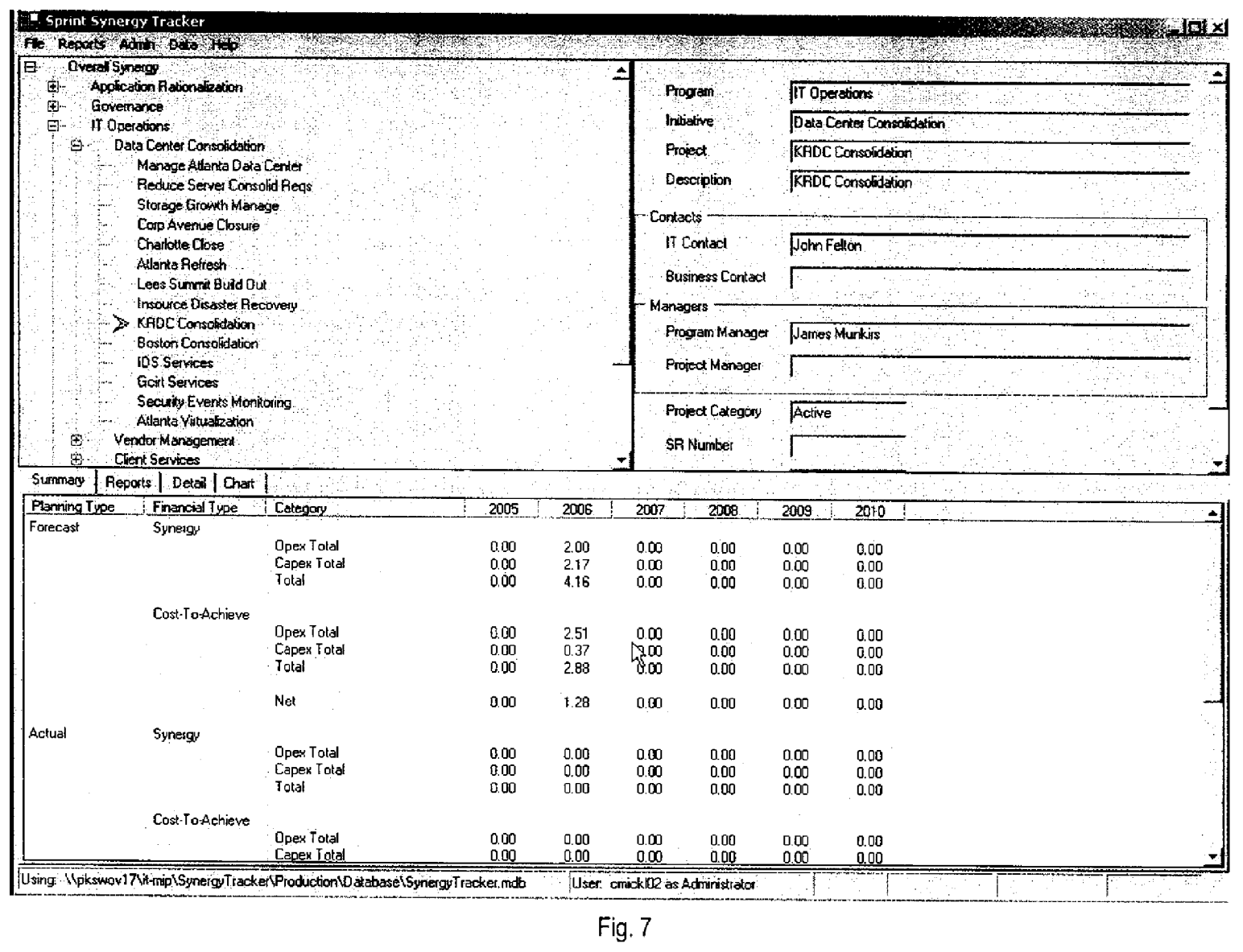

As shown in FIG. 5 an Opex/Capex (operational expense and capital expense) view may also be selected from menu 112. FIG. 7 shows how window 108 is updated upon selecting the Opex/Capex view. For clarification, Opex refers to operational expenses for implementing the selected category 106 and Capex refers to the capital expenses to create or implement the selected category 106. As before with the Categories view, the total is still shown for each financial type and the net is still shown for each planning type.

Figure 8:
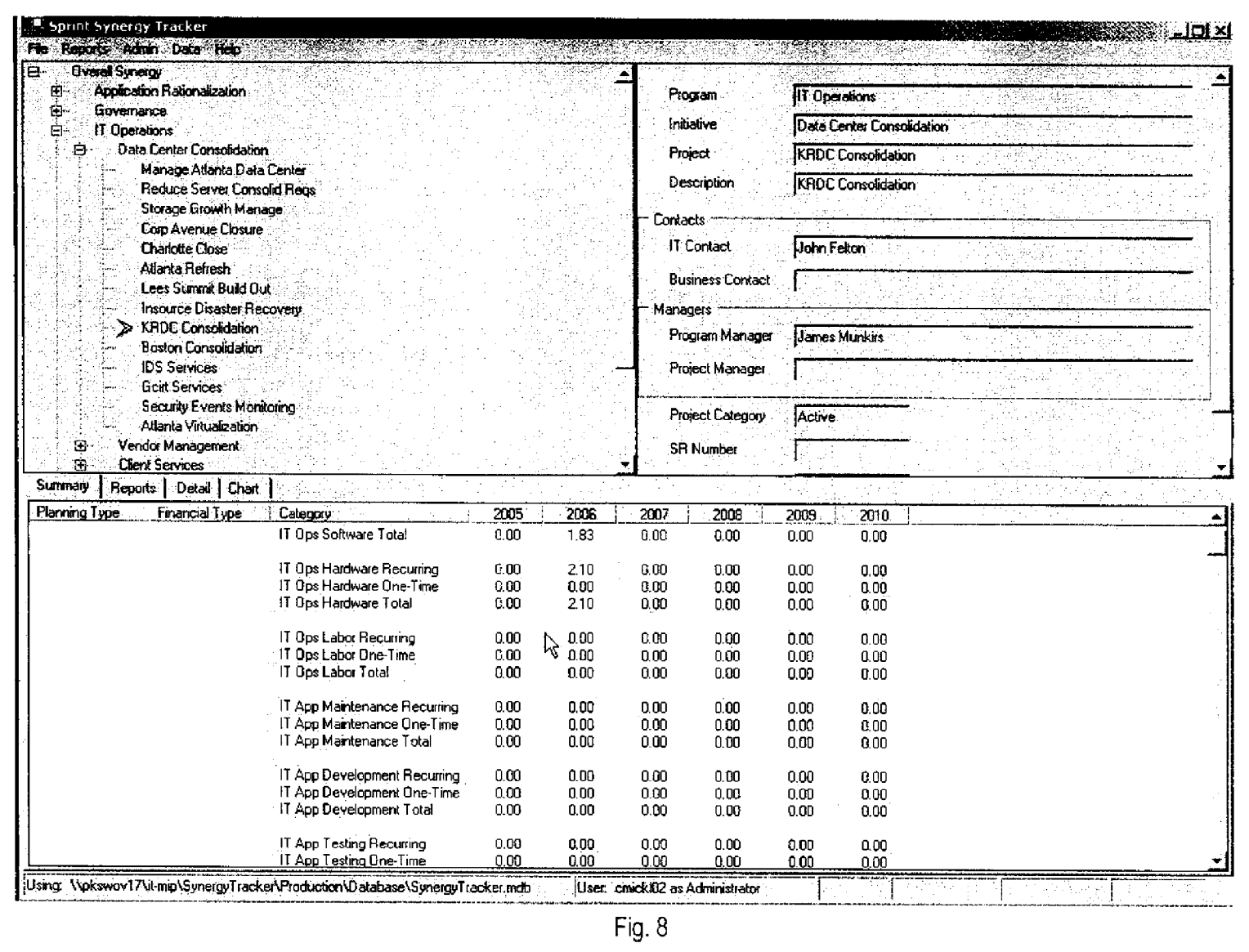

A More Detail option may also be selected from menu 112 as shown in FIG. 5. Upon selecting the More Detail option a further breakdown of each category in window 108 is made by One-Time and Recurring events. FIG. 8 shows an example of how window 108 is updated upon selecting the More Detail option within the Category view. Window 108 may similarly be updated upon selecting the More Detail option within any of the other views in the Summary tab.

As shown in FIG. 5, menu 112 may also include an option to export the data shown in window 108 to a spreadsheet program, such as MICROSOFT EXCEL. This option enables users who are more familiar or comfortable with manipulating data in a spreadsheet to be able to do so with portions of the synergy data. In this way, the limits of the spreadsheet will not be exceeded by trying to organize all of the synergy data using a spreadsheet program.

Figure 9:
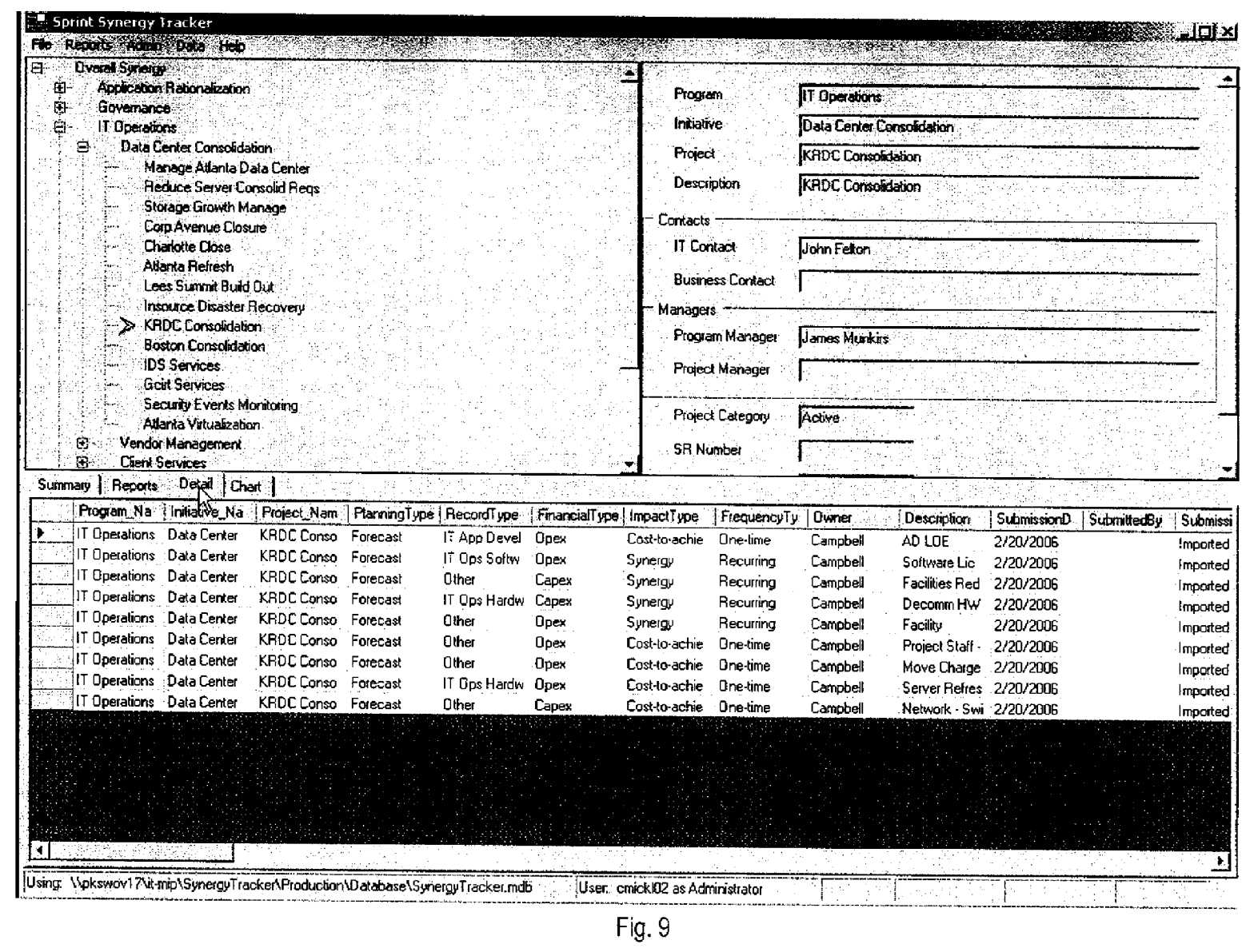
Figure 10:
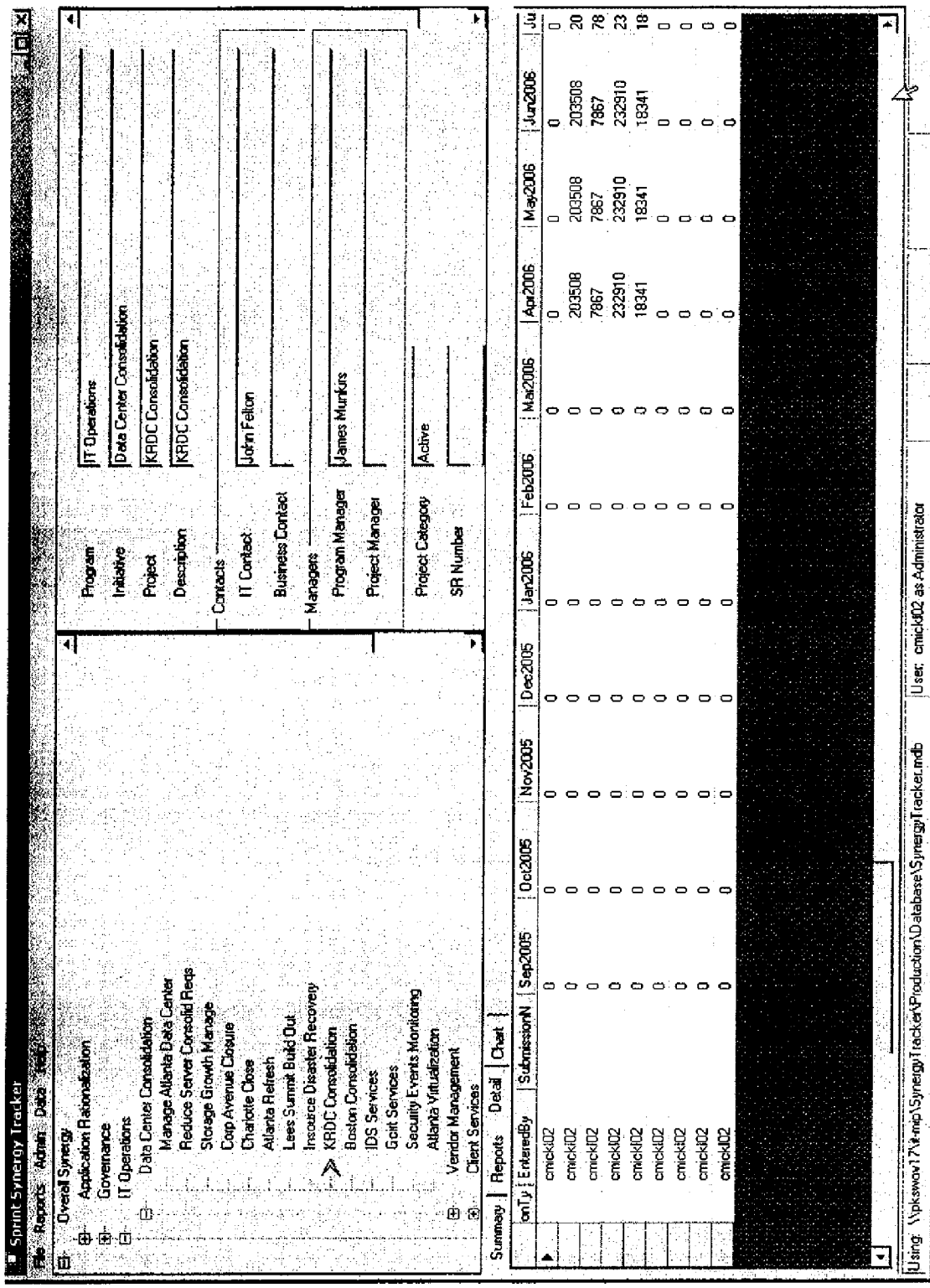
FIG. 10 shows an illustrative view upon selecting the Details tab and using the scroll bar to pan window 108 to the right.

FIG. 9 depicts how window 108 may be populated upon selecting the Detail tab. The window 108 may include a line item view of the data for the selected category 106 in window 102 as broken down by a plurality of column headings. The column headings may describe the data in various ways such as through a Program Name, Initiative Name, Project Name, a Planning Type, a Financial Type, a Record Type, Description, etc. The Planning Type may refer to any of a target, forecast, or actual synergy. The Financial Type indicates that the synergy is from capital expenses or operational expenses. The Record Type may refer to any one of the categories exposed in the Categories view shown in FIG. 6. Each row corresponds to a different line item of the selected category 106 as detailed in the Description column. As shown in FIG. 10 by using the scroll bar as the bottom of window 108 it can be seen that the data may further be organized by month for a time period corresponding to the selected category. In the example of the "KRDC Consolidation", the time period is five years as was discussed above.

Figure 11:
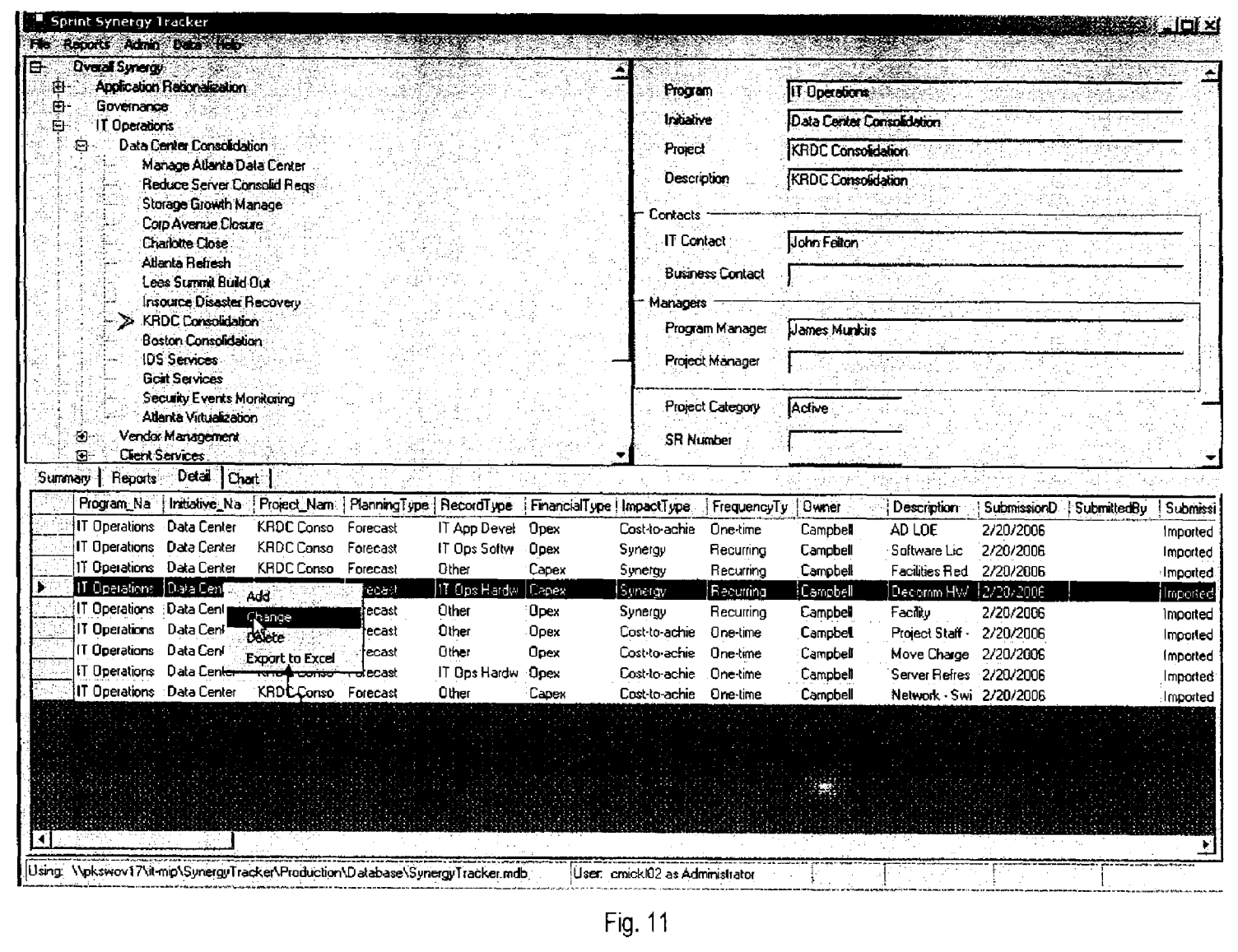
Figure 12:
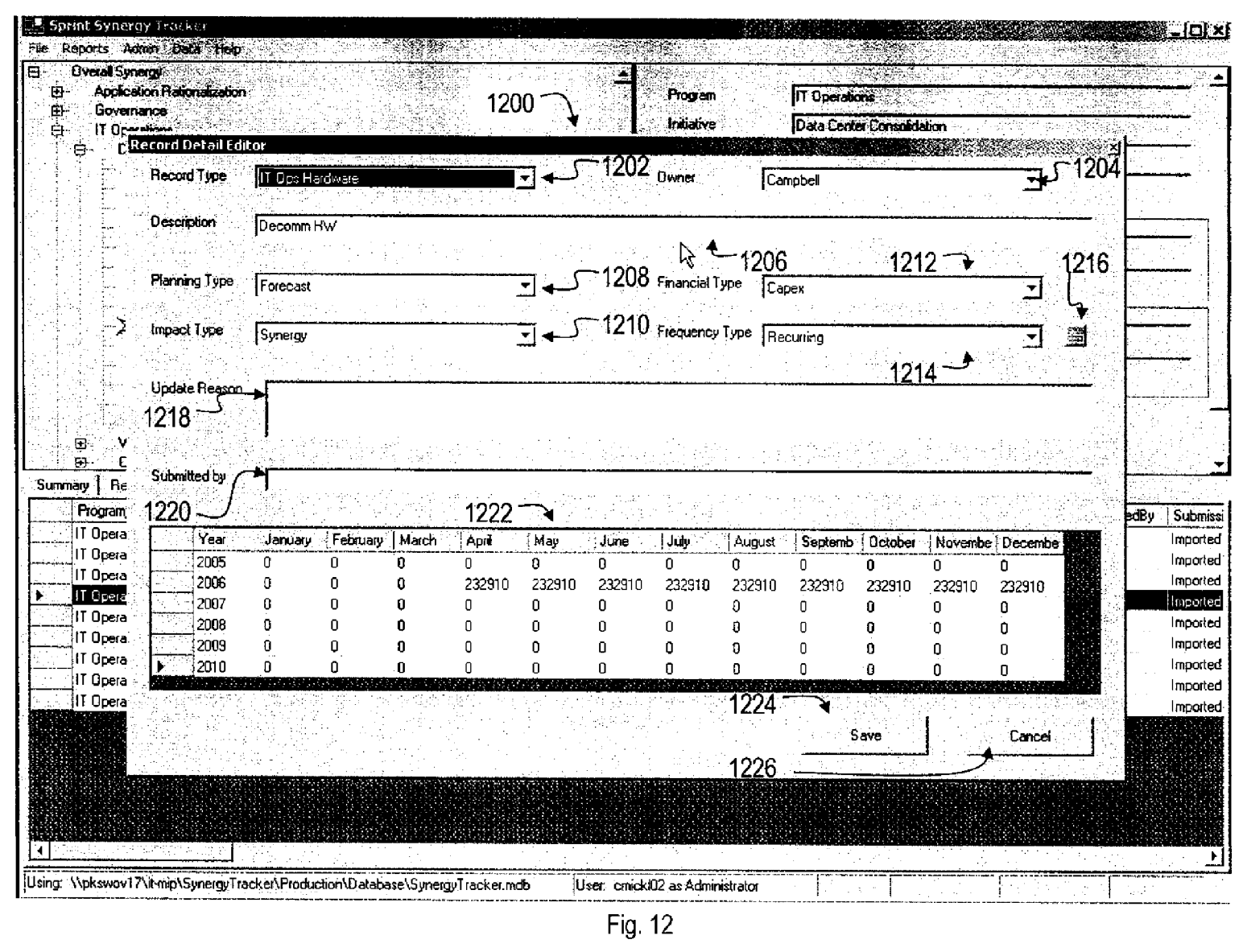

Shown in FIG. 11, similar to the menu 112, a menu 114 may be accessed in order to select various options for manipulating the data in the Detail tab. As with menu 112, menu 114 may be accessed by right-clicking in window 108 or by any other method. Menu 114 includes options to Add, Change, Delete, and Export the data shown in window 108. Upon selecting the Delete option, the selected line item record(s) would be deleted. Upon selecting the Export option, the data shown in window 108 would be exported to a spreadsheet, such as MICROSOFT EXCEL, in the same way as described above. Upon selecting either the Add or Change option another GUI window 1200 may be opened as shown in FIG. 12. In the example shown in FIG. 12 the Change option was selected. Had the Add option been selected none of the fields in the GUI window 1200 would have been populated or a default setting for each of the fields would be shown, for example.

Within GUI window 1200 there are various drop-down menus for selecting descriptors of the data set contained in the grid 1222 at the bottom of GUI window 1200. Each of the descriptors corresponds to a column heading in window 108. The descriptor menus include a selection for a Record Type 1202, Owner 1204, Description 1206, Planning Type 1208, Impact Type 1210, Financial Type 1212, and Frequency Type 1214. Each drop down menu may include a plurality of options to choose from. For example, the Impact Type 1210 may include options for Synergy and cost-to-achieve, the Financial Type 1212 may include options for Capex or Opex, etc. It is noted that for the Frequency Type 1214 that if the Recurring option is selected then tool button 1216 may be selected. GUI window 1200 also includes an area 1218 for indicating why the data is being updated or changed as well as an area 1220 for indicating who is submitting the changes. The changes to the data may be saved and tracked through a data history log, for example. The data set contained in the grid 1222 at the bottom of GUI window 1200 may then be manipulated though keyboard inputs, for example, to update or change the data set. Upon completing any changes a save button 1224 may be pressed to save the changes or if the changes are not to be saved a cancel button 1226 may be pressed.

Figure 13:
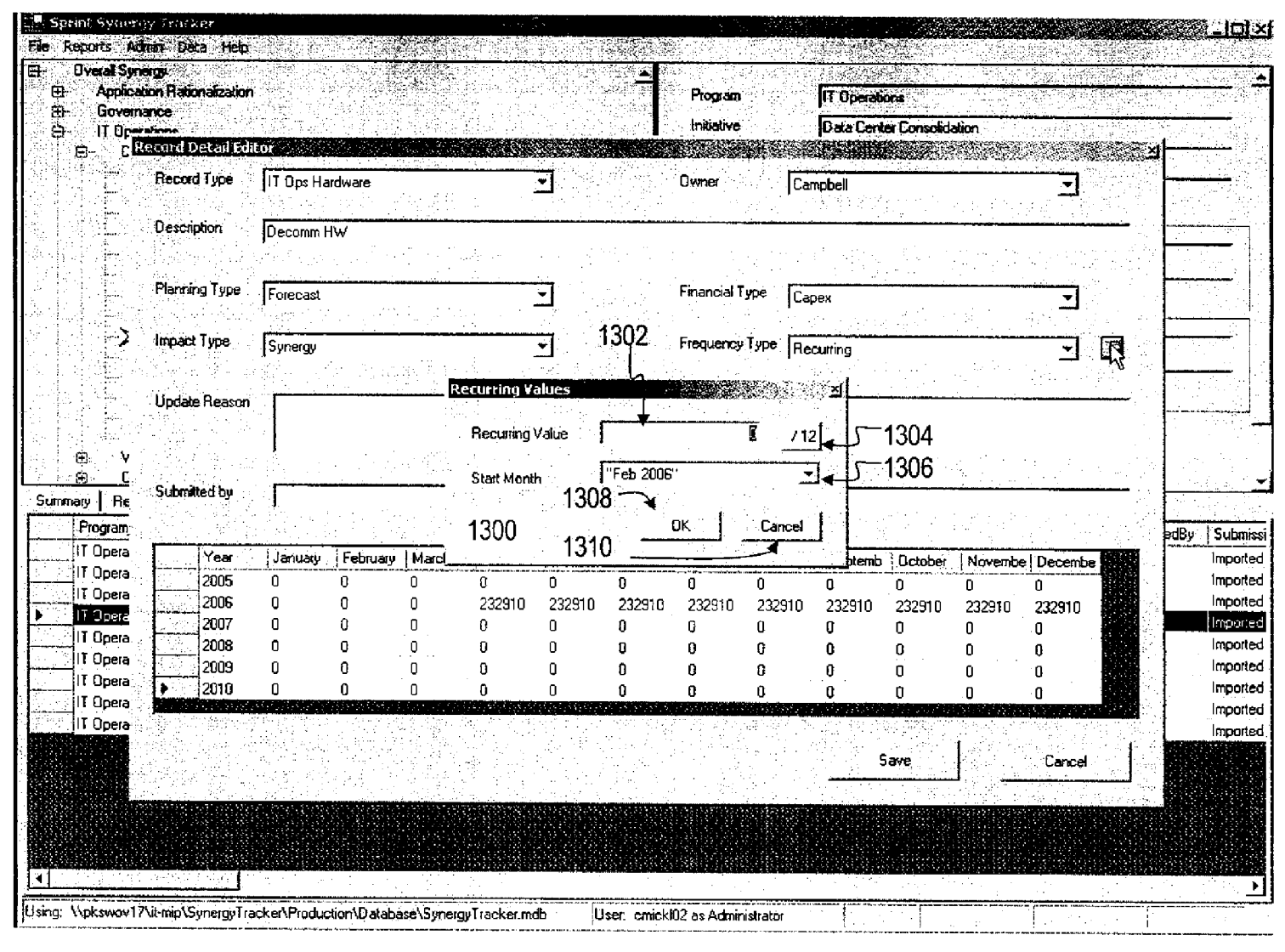

FIG. 13 depicts the GUI window 1300 that is displayed if a user selects the Recurring Value tool button 1216. The GUI window 1300 includes a Recurring Value field 1302 where a user may enter in the monthly recurring value. Note that if the user is only provided a yearly total for the recurring value, a calculator button 1304 may be pressed to divide whatever value is present in the Recurring Value field 1302 by twelve. In this way the monthly recurring value may be calculated over the period of a year. The GUI window 1300 also includes a drop down menu 1306 for indicating the start date for the recurring value. Upon completing any changes in the GUI window 1300 the OK button 1308 may be pressed to apply the changes or the cancel button 1310 may be pressed to cancel any changes.

Figure 14:
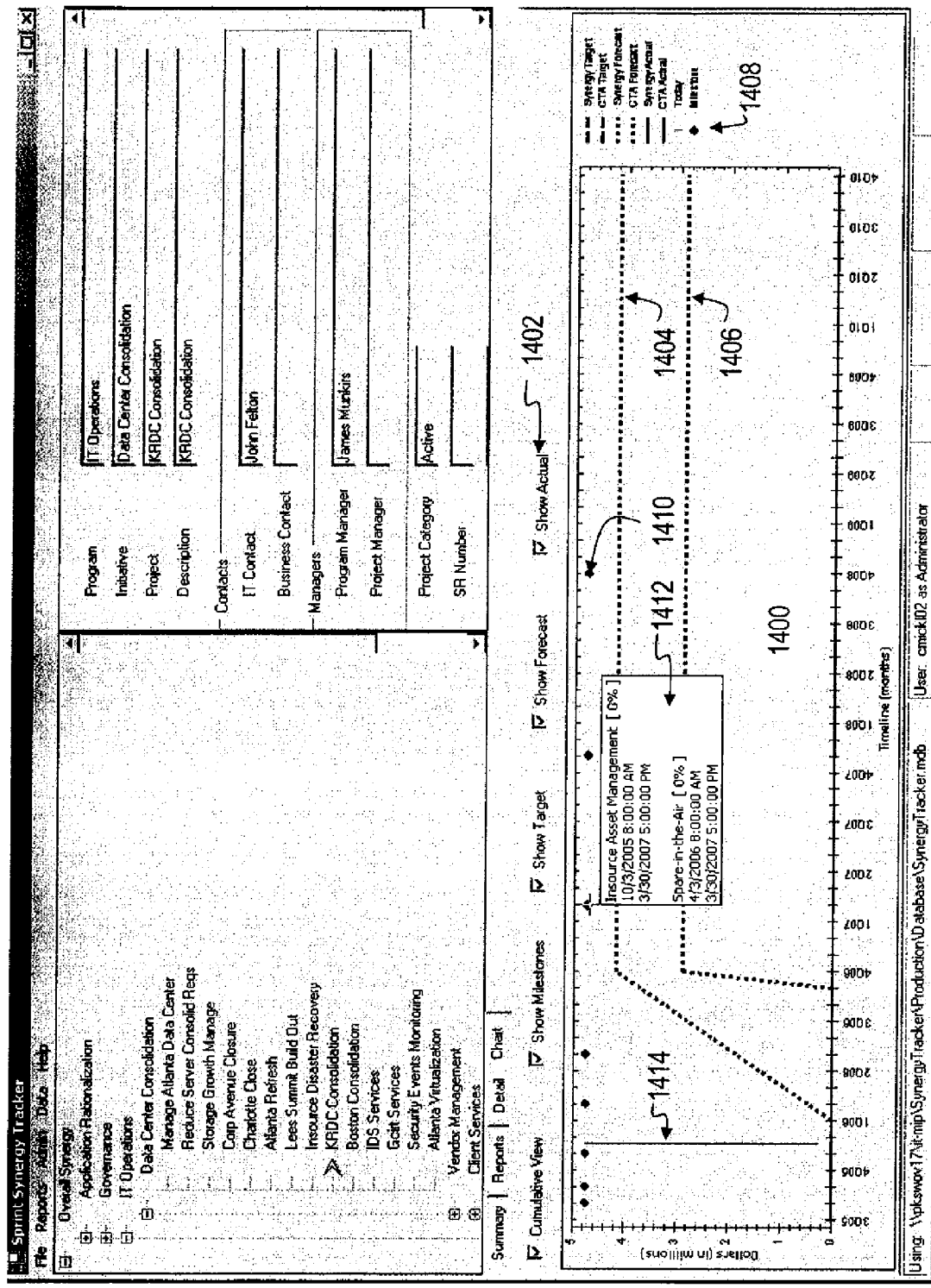
FIG. 14 shows an illustrative view of window 108 upon selecting the Chart tab.

FIG. 14 depicts how window 108 may be populated upon selecting the Chart tab. The chart provides a visual representation of the cumulative synergy data for the selected category 106 in millions of dollars on a monthly basis. The information displayed on the chart may be modified by selecting/deselecting various check boxes 1402 in order to show a user a desired set of data. The check boxes 1402 may select to display/hide any of the target, forecast, and actual data, wherein the cost-to-achieve and the synergy created are displayed for each selected planning type.

Line 1404 represents a group of overlapping lines indicating the target and forecast synergy created by the selected category 106. Note that the chart shown was created using test data and as such does not necessarily represent real world conditions. Since each of the lines for the synergy overlap in line 1404 this indicates that the forecast synergy is predicting that the target synergy goal will be achieved. Similarly, line 1406 represents a group of overlapping lines indicating the target and forecast cost-to-achieve the selected category 106. Since line 1404 is higher than line 1406 this indicates a net positive synergy is created in the selected category 106. The legend 1408 indicates which lines/symbols represent which type of data and promotes easy readability of the chart. Upon deselecting a check box 1402 the corresponding data type(s) is removed from the chart and the legend in order to reduce clutter and/or confusion in the chart. The chart also plots actual synergy achieved on a monthly basis, however, the actual synergy is only provided up to the current day or month as indicated by line 1414.

As shown by the check boxes 1402 there is an option to show milestones of the data. The milestones are represented by the dots such as shown by element 1410 and indicated in the legend 108. These milestones represent important dates in the plan for implementing the merger. Milestone data may be imported from outside sources such as through MICROSOFT PROJECT MANAGER. The milestones align the implementation plan with the financial plan for the merger or other activity and help provide an explanation of why trends exposed in the chart through the actual synergies achieved are occurring. As shown by window 1412, when a user moves a cursor over a milestone dot, the various events occurring at that milestone date are shown along with a duration of the events and an indication of the percent of the event that has already been completed. As shown in FIG. 14, the two events shown by window 1412 have zero percent complete since they are future milestone events as indicated by being forward in time from the current day or month indicated by line 1414. It is noted that the milestones on higher level categories in window 102 may indicate different granularity of the project implementation plan. For example, milestones shown on a program level may only indicate major releases. It is noted that while the views in the Summary or Detail tab did not include any indication of milestone data, the milestone data may similarly be added to those views. For example, the milestone data may be included as a line item in a column or row of window 108. Alternatively, upon a user moving a cursor over a cell in window 108 corresponding to milestone data a window similar to window 1412 may be shown indicating the milestone data.

Through overlaying the financial plan with the milestone data of the implementation plan a user or the GUI 100 may be able to detect when the implementation plan is no longer in sync with the financial plan. When the plans are out of synch the GUI 100 may automatically update the implementation plan milestone schedule based on changes to the financial plan schedule or update the financial plan schedule based on changes to the implementation plan milestone schedule. Alternatively, the user may be notified upon the occurrence of either of these events and the user may allow the GUI 100 to perform an automatic update to either of the plans or the user themselves may perform an update. Upon a change being implemented in the GUI 100 to either plan, any interested party such as project managers, investors, etc., may be notified.

In order to accomplish automatic updating of the milestone schedule or financial plan, the GUI 100 may link projects based on their financial and/or project dependencies. By linking all of the projects together in this way a new financial plan may be recreated based on changes to one or more projects. Further, by having the various projects linked to each other and the financial plan, a financial optimization may be performed such that a prioritized order of implementing the projects may be created. Also, in the event of a system consolidation the GUI 100 may perform application rationalization in order to determine the optimal application or system to be selected. For example, as described above with the unified billing system example the billing system of Enterprise A may be selected to implement all of the features of the billing system of Enterprise B. This decision may have been made based on an application rationalization comparison as described above. Another benefit to linking all of the projects and plans together is the ability of the GUI 100 to then scan the financial and project information to identify possible areas where expenses or savings are being counted more than once. For example, if there are identical expense entries at a project start date and a project end date, this may indicate either that the half of the expenses for the project were charged up front on the project start date and the other half of the expenses were charged at the project end date. However, having identical expense entries at a project start date and a project end date may also indicate that the same expense for the project is being double counted.

Figure 15:
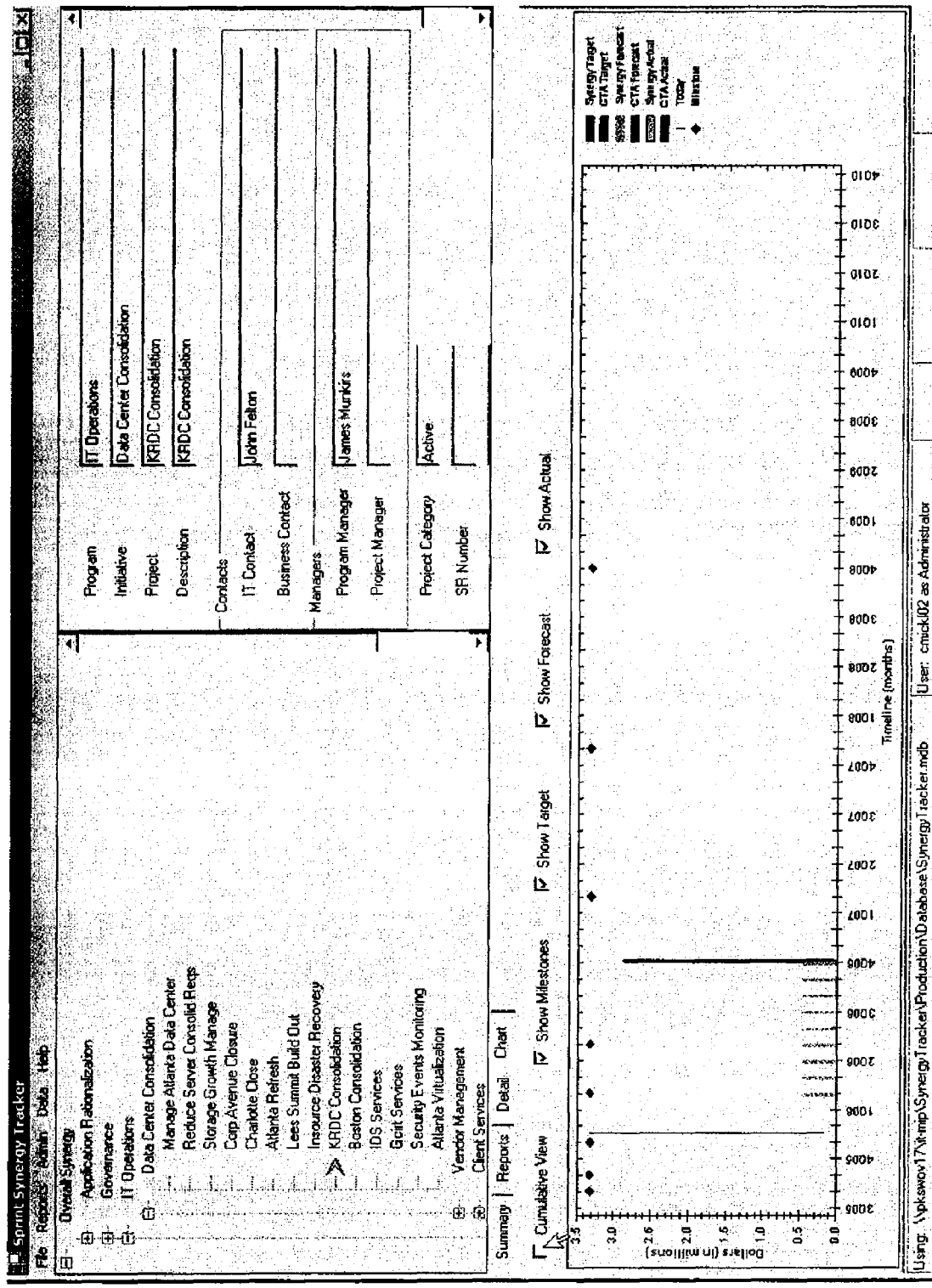
FIG. 15 shows an illustrative view of window 108 upon deselecting a cumulative view.

Looking back to the Chart view, FIG. 15 shows how window 108 is updated upon deselecting the cumulative view check box 1402. Instead of displaying the cumulative synergy data for the selected category 106 in millions of dollars on a monthly basis, as was the case in FIG. 14, a monthly total of the synergy data for the selected category 106 in millions of dollars is shown.

Figure 16:
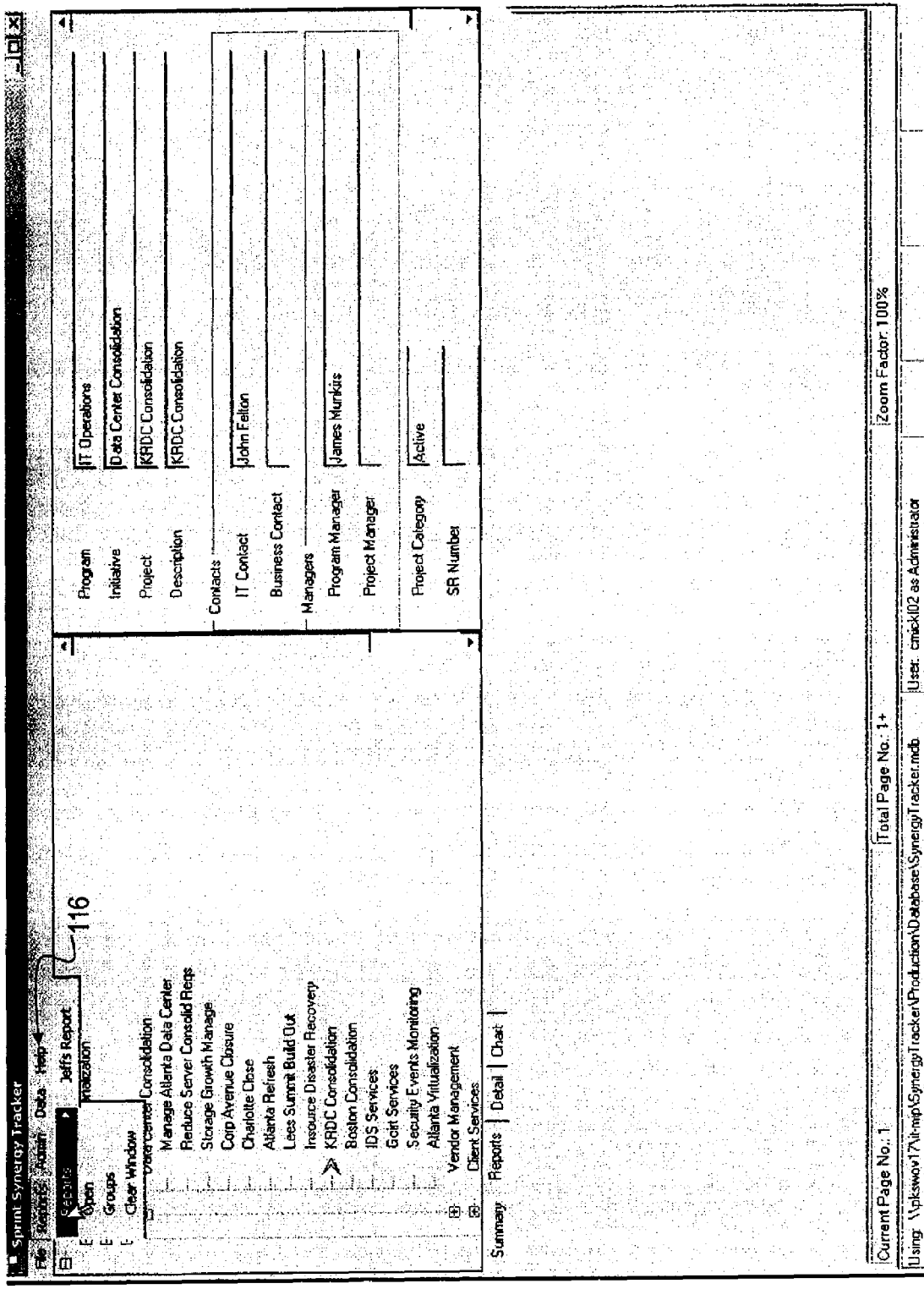
FIG. 16 shows an illustrative view of menus 116.

FIG. 16 depicts how window 108 may be populated upon selecting the Reports tab. As shown in FIG. 16 the window 108 is currently unpopulated since a report has not yet been selected. GUI 100 may include various menus 116, one of which is a reports menu. In the reports menu are selections for Reports which provides a list of recently viewed or edited reports, a selection to Open reports from a specified location, a selection to create Groups for reporting as will be discussed in detail below, and a selection to clear window 108. The reports may be provided through any known reporting program such as CRYSTAL REPORTS and either displayed in window area 108 or in a separate screen as was the case with exporting the data to EXCEL.

Figure 17:
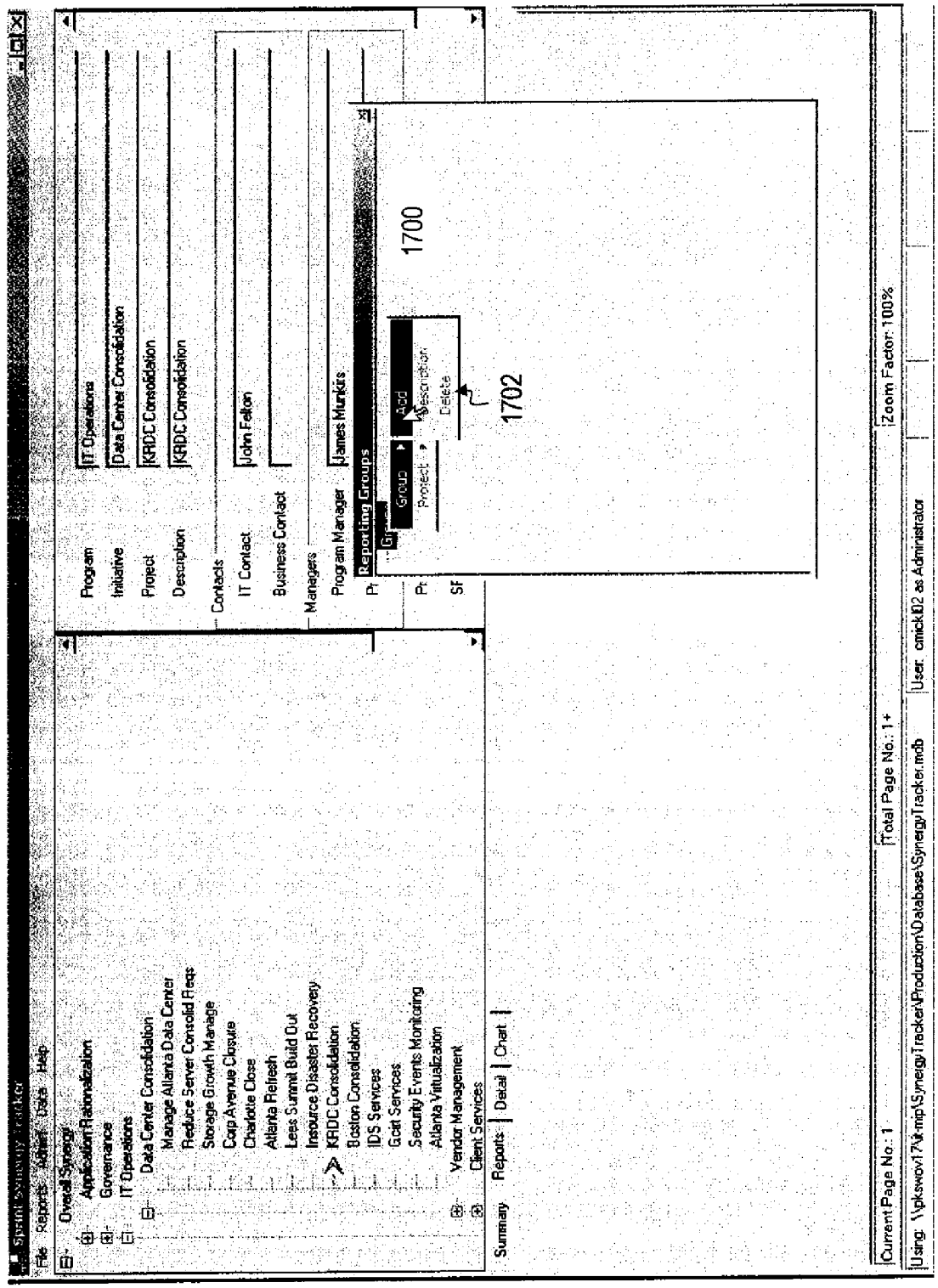
FIG. 17 shows an illustrative view of creating a custom reporting group.
Figure 18:
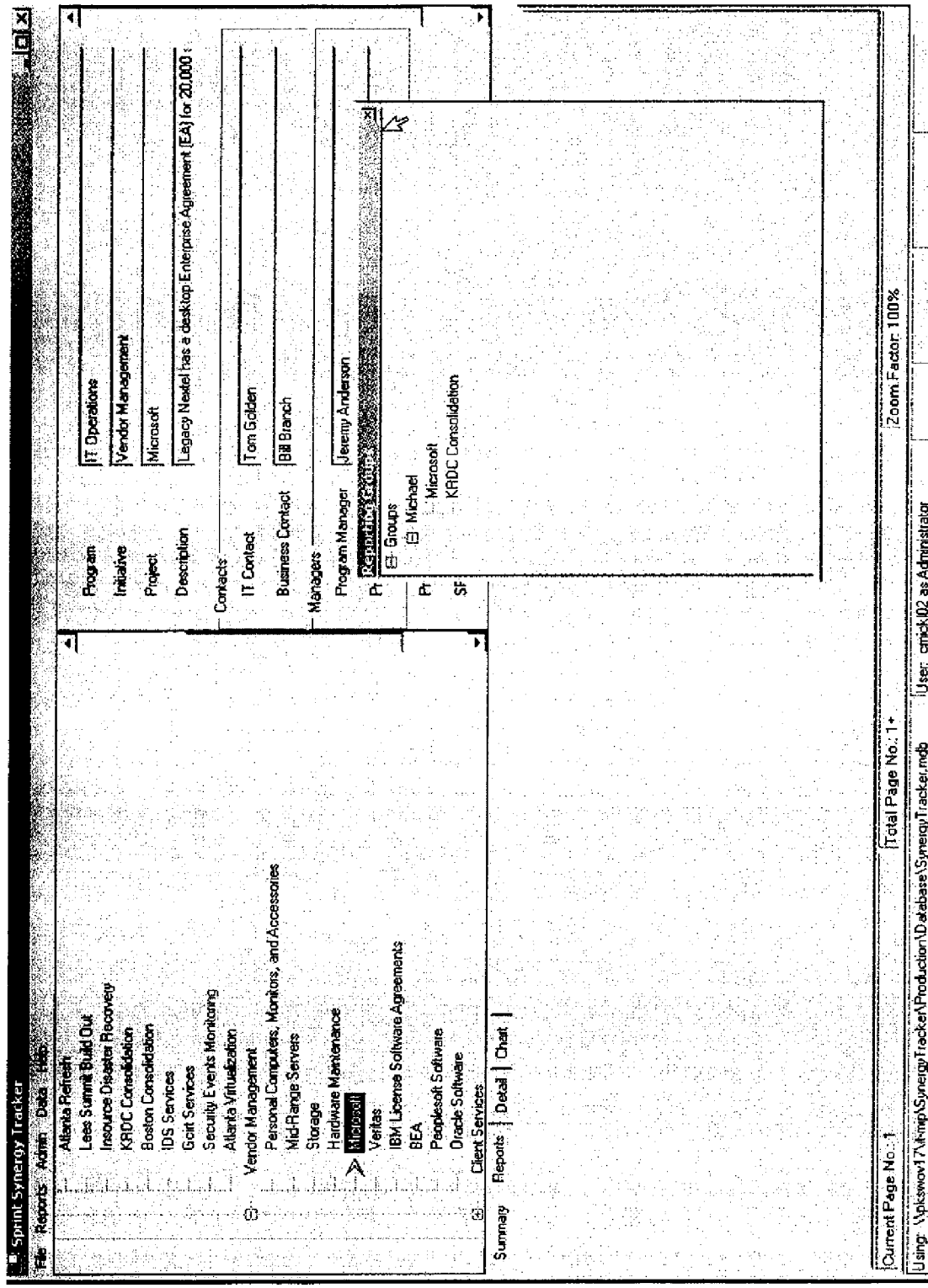
FIG. 18 shows an illustrative view of the custom reporting group.

The Groups selection from reports menu may be used to create custom groupings of various diverse projects. Upon selecting the Groups option a Group GUI window 1700 is displayed as shown in FIG. 17. A user may then select a menu 1702 by right-clicking in the Group GUI window 1700, for example. Menu 1702 provides options to Add a group, provide a Description of the custom group, or Delete a group. When a user selects to Add a group a New Group GUI window may be displayed. The New Group GUI window may include a field for a user to enter in a name for the new group using keyboard inputs, for example. Upon a user entering in the desired name an OK button may be pressed to create the new group, otherwise a Cancel button may be pressed to cancel the creation of a new group. Once the new group is created various projects desired by the user may be dragged from window 102 into the Group GUI window 1700 to create a customized group of projects of interest to the user as shown in FIG. 18. This ability to create custom groups allows for reporting on various projects that may be organized under diverse program or initiative categories shown in window 102.

As shown in FIG. 16, the GUI 100 may include various menus 116 such as a File menu, the Reports menu described above, an Admin menu, a Data menu, and a Help menu. The File menu may include an option to exit the GUI 100, the Admin menu may include a Users and Reports option for setting user privileges, profiles, etc. As an alternative, the Admin menu may also include an option for customizing the hierarchy of window 102 to be set to any relational hierarchy a user may want. The Data menu includes an option to Import Data in one of a plurality of data formats such as comma delimited text files, EXCEL files, etc. This option may be used to import data concerning the business case spreadsheets that the GUI 100 may use to generate the target data as described below. The Data menu also includes an option to create a template for importing data from EXCEL or other spreadsheet files. When an enterprise first creates a financial justification for a merger or other activity, various spreadsheets may be used to detail the business case justification. The template option provides a unified way for the various projects, initiatives, and programs, to organize the data for the business case financial justification. All of this data may then be imported into the GUI 100 and used as the target synergy data, for example. Further, the Import Data option may be used to import data into the GUI 100 directly from various financial databases to provide the actually synergy data. The Help menu may include an About option for displaying a window with various information about the GUI 100 such as copyright information.

Disclosed above is a synergy tracking tool and method for tracking target, forecast, and actual synergies created by a merger or other activity in conjunction with an implementation plan for implementing the merger or other activity. This provides a way for reporting savings and lining up the savings with an implementation plan to explain why the savings are occurring. Further, the synergy tracking tool may link projects together based on financial and/or project dependencies in order to provide robust tools for analyzing, updating, and optimizing both of the project implementation and the financial plans.

While the synergy tracking tool was described above as being used to track mergers in order to ensure they provide the savings that was projected, it is noted that the synergy tracking tool may also be used to evaluate possible synergies created from a merger in a clean room situation. In other words, the synergy tracking tool may be used prior to generating an implementation or financial plan to determine the feasibility of a merger and to set a target synergy for the possible merger.

The synergy tracking tool may also be used to evaluate consolidation efforts or other similar issues within an enterprise. For example, an enterprise may be sustaining multiple billing systems in order to support both legacy customers and new customers. The synergy tracking tool may be used to evaluate possible synergies created by consolidating the billing systems into one system within the enterprise.

Figure 19:
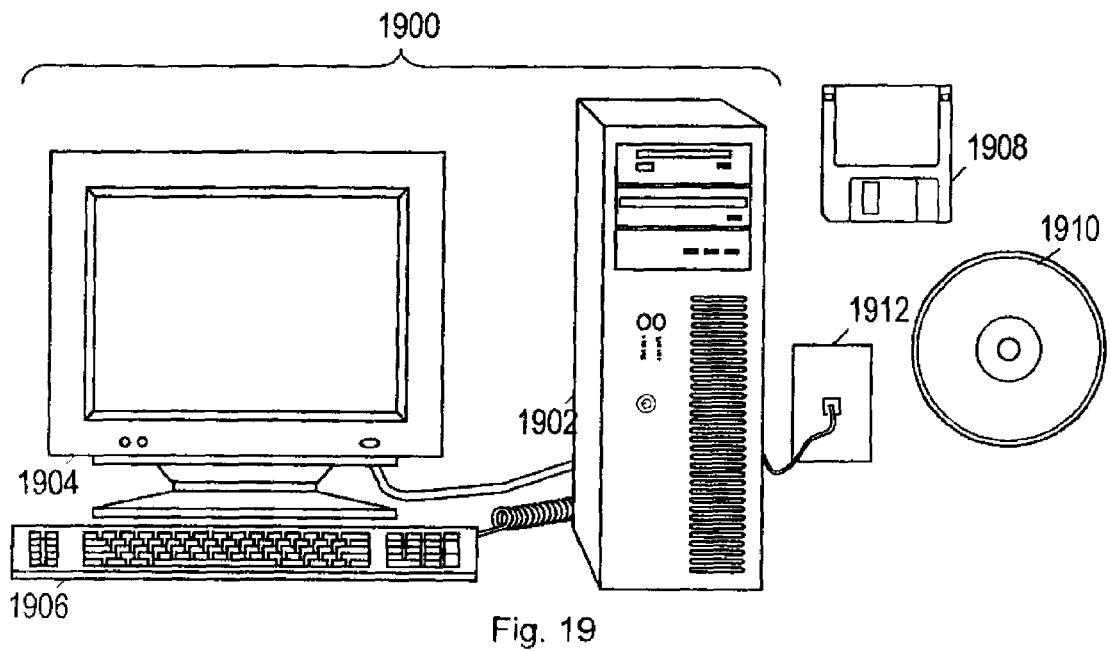
FIG. 19 shows an illustrative synergy tracking system embodied as a desktop computer.

FIG. 19 shows an illustrative system 1900 for synergy tracking. System 1900 is shown as a desktop computer 1900, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, illustrative system 1900 comprises a chassis 1902, a display 1904, and an input device 1906. The chassis 1902 comprises a processor, memory, and information storage devices. One or more of the information storage devices may store programs and data on removable storage media such as a floppy disk 1908 or an optical disc 1910. The chassis 1902 may further comprise a network interface that allows the system 1900 to receive information via a wired or wireless network, represented in FIG. 1 by a phone jack 1912. The information storage media and information transport media (i.e., the networks) are collectively called "information carrier media."

The chassis 1902 is coupled to the display 1904 and the input device 1906 to interact with a user. The display 1904 and the input device 1906 may together operate as a user interface. The display 1904 is shown as a video monitor, but may take many alternative forms such as a printer, a speaker, or other means for communicating information to a user. The input device 1906 is shown as a keyboard, but may similarly take many alternative forms such as a button, a mouse, a keypad, a dial, a motion sensor, a camera, a microphone or other means for receiving information from a user. Both the display 1904 and the input device 1906 may be integrated into the chassis 1902.

Figure 20:
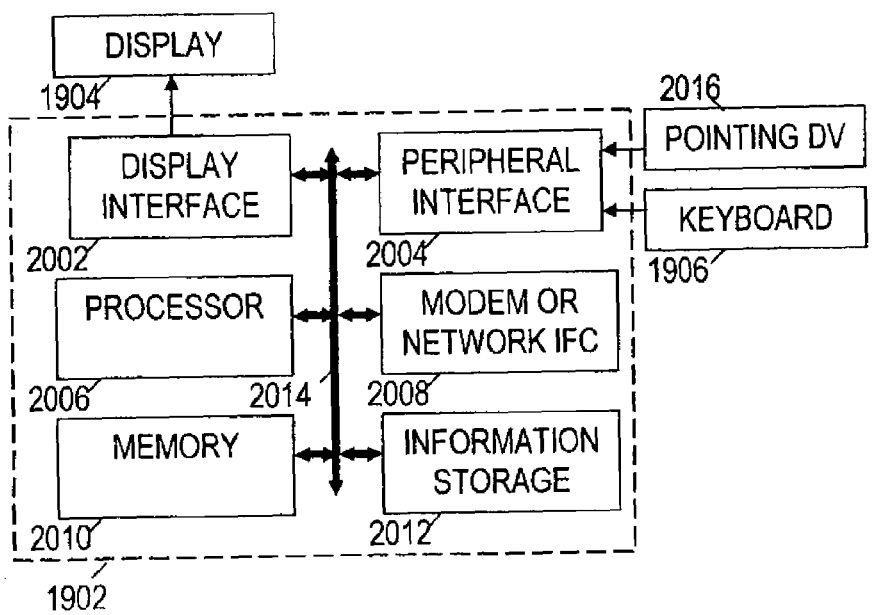
FIG. 20 shows a block diagram of an illustrative synergy tracking system.

FIG. 20 shows a simplified functional block diagram of system 1900. The chassis 1902 may comprise a display interface 2002, a peripheral interface 2004, a processor 2006, a modem or other suitable network interface 2008, a memory 2010, an information storage device 2012, and a bus 2014. System 1900 may be a bus-based computer, with the bus 2014 interconnecting the other elements and carrying communications between them. The display interface 2002 may take the form of a video card or other suitable display interface that accepts information from the bus 2014 and transforms it into a form suitable for the display 1904. Conversely, the peripheral interface 2004 may accept signals from the keyboard 1906 and other input devices such as a pointing device 2016, and transform them into a form suitable for communication on the bus 2014.

The processor 2006 gathers information from other system elements, including input data from the peripheral interface 2004, and program instructions and other data from the memory 2010, the information storage device 2012, or from a remote location via the network interface 2008. The processor 2006 carries out the program instructions and processes the data accordingly. The program instructions may further configure the processor 2006 to send data to other system elements, comprising information for the user which may be communicated via the display interface 2002 and the display 1904.

The network interface 2008 enables the processor 2006 to communicate with remote systems via a network. The memory 2010 may serve as a low-latency temporary store of information for the processor 2006, and the information storage device 2012 may serve as a long term (but higher latency) store of information.

The processor 2006, and hence the computer 1900 as a whole, operates in accordance with one or more programs stored on the information storage device 2012. The processor 2006 may copy portions of the programs into the memory 2010 for faster access, and may switch between programs or carry out additional programs in response to user actuation of the input device. The additional programs may be retrieved from information the storage device 2012 or may be retrieved from remote locations via the network interface 2008. One or more of these programs configures system 1900 to carry out at least one of the synergy tracking methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A non-transitory computer-readable medium containing instructions that, when placed in operable relation to a computing device, cause the computing device to:
   display a hierarchical grouping of activities in a merger;
   receive user inputs to select one of the displayed activities;
   display synergy data corresponding to the selected activity, wherein the synergy data comprises target, forecast, and actual synergy data over a period of time and the synergy data further comprises a component of a cost-to-achieve the merger and a component of a synergy created by the merger for each of the target, forecast, and actual synergy;
   overlay milestone data corresponding to a plan to implement the merger with the synergy data; and
   selectively display the synergy data as one of a summary, detail, chart, or report organization,
   wherein the summary organization comprises the synergy data with a component of a net synergy calculated by subtracting the cost-to-achieve from the synergy created for each of the target, forecast, and actual synergy, wherein the summary organization selectively describes each of the component of a cost-to-achieve and the component of a synergy created as one of a total, categorical, or operational expense/capital expense view, and the summary organization further selectively describes each item in the selected view as a portion of one-time and a portion of recurring costs-to-achieve or synergy created.

2. The instructions of claim 1, wherein:
   the detail organization comprises the synergy data as broken down by one or more line items of the selected activity.

3. The instructions of claim 1, further causing the computing device to:
   export the synergy data as displayed in the summary or detail organization.

4. The instructions of claim 1, wherein:
   the chart organization comprises the cost-to-achieve and the synergy created selectively plotted for one or more of the target, forecast, actual synergy, and milestone data, wherein
   the chart organization is selectively plotted as a bar graph depicting the synergy data on a monthly basis or as a line graph depicting the cumulative synergy data.

5. The instructions of claim 1, further causing the computing device to:
   create custom hierarchical groupings of activities.

6. The instructions of claim 1, further causing the computing device to:
   import data used for generating each of the target, forecast, and actual synergy.

7. The instructions of claim 1, further causing the computing device to:
   display events of the plan to implement the merger occurring at a milestone date upon receiving selection of a representation of a corresponding milestone.

8. The instructions of claim 1, further causing the computing device to:
   automatically update a milestone schedule of the plan to implement the merger based on changes to a schedule of a financial plan associated with the synergy data; or
   automatically update the schedule of the financial plan based on changes to the milestone schedule of the plan to implement the merger.

9. The instructions of claim 1, further causing the computing device to:
   scan a financial plan associated with the synergy data and a milestone schedule of the plan to implement the merger to identify possible expenses or savings that are being counted more than once.

10. The instructions of claim 1, further causing the computing device to:
    create a user-defined customized group of at least some of the activities, wherein the report organization comprises a report on the at least some of the activities that are included in the user-defined customized group.

11. A system for tracking synergy, comprising:
    memory that stores synergy tracking software; and
    a processor coupled to the memory to execute the synergy tracking software,
    wherein the synergy tracking software configures the processor to:
       display a hierarchical grouping of activities in a merger;
       receive user inputs to select one of the displayed activities;
       display synergy data corresponding to the selected activity, wherein the synergy data comprises target, forecast, and actual synergy data over a period of time and the synergy data further comprises a component of a cost-to-achieve the merger and a component of a synergy created by the merger for each of the target, forecast, and actual synergy;
       overlay milestone data of a plan to implement the merger with the synergy data; and
       selectively display the synergy data as one of a summary, detail, chart, or report organization,
       wherein the summary organization comprises the synergy data with a component of a net synergy calculated by subtracting the cost-to-achieve from the synergy created for each of the target, forecast, and actual synergy, wherein the summary organization selectively describes each of the component of a cost-to-achieve and the component of a synergy created as one of a total, categorical, or operational expense/capital expense view, and the summary organization further selectively describes each item in the selected view as a portion of one-time and a portion of recurring costs-to-achieve or synergy created.

12. The system for tracking synergy of claim 11, wherein:
    the detail organization comprises the synergy data as broken down by one or more line items of the selected activity.

13. The system for tracking synergy of claim 11, wherein:
    the chart organization comprises the cost-to-achieve and the synergy created selectively plotted for one or more of the target, forecast, actual synergy, and milestone data, wherein
    the chart organization is selectively plotted as a bar graph depicting the synergy data on a monthly basis or as a line graph depicting the cumulative synergy data.

14. The system for tracking synergy of claim 11, wherein the synergy tracking software further configures the processor to:
    import the milestone data from an external project manager application.

15. The system for tracking synergy of claim 11, wherein the synergy tracking software further configures the processor to:
    display events of the plan to implement the merger occurring at a milestone date upon receiving selection of a representation of a corresponding milestone.

16. The system for tracking synergy of claim 11, wherein the synergy tracking software further configures the processor to:
    automatically update a milestone schedule of the plan to implement the merger based on changes to a schedule of a financial plan associated with the synergy data; or
    automatically update the schedule of the financial plan based on changes to the milestone schedule of the plan to implement the merger.

17. The system for tracking synergy of claim 16, wherein the synergy tracking software further configures the processor to:
    link projects in the plan to implement the merger based on based on financial and/or project dependencies.

18. The system for tracking synergy of claim 17, wherein the synergy tracking software further configures the processor to:
    perform a financial optimization to prioritize an order of implementing the projects.

19. The system for tracking synergy of claim 11, wherein the synergy tracking software further configures the processor to:
    scan a financial plan associated with the synergy data and a milestone schedule of the plan to implement the merger to identify possible expenses or savings that are being counted more than once.

20. The system for tracking synergy of claim 11, wherein the synergy tracking software further configures the processor to:
    create a user-defined customized group of at least some of the activities, wherein the report organization comprises a report on the at least some of the activities that are included in the user-defined customized group.

* * * * *